(12) United States Patent
Wagner

(10) Patent No.: US 12,280,746 B1
(45) Date of Patent: Apr. 22, 2025

(54) MINIMAL LIFT BIKE CARRIER

(71) Applicant: SPECIALTY REC LLC, Bloomington, MN (US)

(72) Inventor: Reed B. Wagner, Bloomington, MN (US)

(73) Assignee: SPECIALTY REC LLC, Bloomington, MN (US)

( * ) Notice: Subject to any disclaimer, the term of this patent is extended or adjusted under 35 U.S.C. 154(b) by 64 days.

(21) Appl. No.: 18/082,299

(22) Filed: Dec. 15, 2022

Related U.S. Application Data

(60) Provisional application No. 63/290,896, filed on Dec. 17, 2021.

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC ............................... B60R 9/10; Y10S 224/924
USPC .......................................................... 224/924
See application file for complete search history.

(56) References Cited

U.S. PATENT DOCUMENTS

| | | | | |
|---|---|---|---|---|
| 3,843,001 A | * | 10/1974 | Willis | B60R 9/10 224/924 |
| 4,524,893 A | * | 6/1985 | Cole | B60R 9/10 211/5 |
| 5,899,655 A | * | 5/1999 | Miller | B60P 3/122 414/537 |
| 9,039,263 B2 | | 5/2015 | Hofmann | |
| 9,321,388 B2 | | 4/2016 | Barnett | |
| 10,315,584 B2 | * | 6/2019 | Kuhlbach | B60L 50/20 |
| 11,383,652 B1 | * | 7/2022 | Huang | B60R 9/10 |
| 2003/0062707 A1 | | 4/2003 | Koch | |
| 2004/0191037 A1 | | 9/2004 | Potts | |
| 2007/0001431 A1 | | 1/2007 | Fiorini | |
| 2008/0067209 A1 | * | 3/2008 | Gunn | B60R 9/10 224/504 |
| 2008/0085176 A1 | | 4/2008 | Statkus | |
| 2016/0068111 A1 | | 3/2016 | Walker | |
| 2019/0023190 A1 | * | 1/2019 | Breen | B60R 9/10 |

FOREIGN PATENT DOCUMENTS

WO   WO 2018/057756 A1   3/2018

* cited by examiner

*Primary Examiner* — Scott T McNurlen
(74) *Attorney, Agent, or Firm* — Mueting Raasch Group

(57) ABSTRACT

A carrier for supporting and transporting a recreational vehicle (e.g., bicycle, tricycle, quadracycle, or trailer) with minimal or no lifting. The carrier includes a support configured to receive and contact tires of the vehicle. The carrier also includes a ramp configured to move relative to the support and slides within one or more slots of the support. The carrier pivots relative to a pivot mount assembly such that the vehicle can be easily moved from a ground surface to the carrier and then pivoted to a generally horizontal position. The ramp acting as a lock for pivoting the carrier by restricting pivoting when slid within the one or more slots of the support and allowing pivoting when the ramp is extended from the support.

12 Claims, 26 Drawing Sheets

MINIMAL LIFT BIKE CARRIER

The present application claims priority to and/or the benefit of U.S. Provisional Patent Application No. 63/290,896, filed Dec. 17, 2021, which is incorporated herein by reference in its entirety.

Embodiments of the present disclosure are directed to carriers designed for heavy and/or awkward bikes, trikes, quadricycles, and trailers (e.g., transporting people behind recreational vehicles) including electric types, and a transport trailer for transporting the carriers.

BACKGROUND

Bike carriers are typically designed to carry bicycles by having a user pick up and position the bicycle on the carrier. For example, the bicycle may be lifted to place the frame on extending hooks (e.g., such that the bicycle may be hanging from the hooks) or the wheels on a surface. Often bicycles are lightweight and simple which makes them easy to move, carry, and manipulate. Also, the lightweight characteristics of the bicycle may make the riding aspect more efficient.

On the other hand, some bikes are larger and heavier, and tricycles, quadracycles, etc. are heavier and a more awkward form to lift. And particularly, electric bicycles (e.g., bicycles, tricycles, quadracycles, etc.) include one or more electrical components that assist with the pedaling effort and are not found in conventional pedal bicycles. For example, the one or more electrical components may include a power source (e.g., a battery), an electric motor, wiring, switches, fuses, displays, controllers, etc. These electrical components often present additional considerations when supporting and transporting the electric bicycle. For example, these electrical components may increase the overall weight of the electric bicycle and may alter the general structure of a conventional bicycle.

For these heavier and more difficult to handle forms, it may be desirable for the user to be able to position the bicycle on a carrier in a way that minimizes lifting and carrying. Further, other limitations of the user may make it desirable to include a more accessible carrier. As such, the present disclosure describes a carrier for supporting and transporting these heavier and more difficult to lift forms with minimal lifting.

SUMMARY

Embodiments of the present disclosure may provide a carrier for supporting and transporting a bicycle. The carrier may include a support extending between a first end region and a second end region along a longitudinal axis. The support may define a top surface adapted to receive and contact tires of the bicycle. The support may include one or more slots extending along the longitudinal axis. The carrier may also include a ramp adapted to move relative to the support along the longitudinal axis. The ramp may slide within the one or more slots of the support. Further, the carrier may include a roller located proximate the first end region and adapted to rotate about an axis perpendicular to the longitudinal axis. The carrier may also include one or more ground engaging members located proximate an end of the ramp and extending beyond either side of the ramp. The one or more ground engaging members may be adapted to contact a ground surface.

Another embodiment of the present disclosure may provide a carrier for supporting and transporting a bicycle. The carrier may include a support extending between a first end region and a second end region along a longitudinal axis. The support may define a top surface adapted to receive and contact tires of the bicycle. The carrier may also include a pivot mount assembly pivotably coupled to the support and may include a retention housing. The retention housing may define one or more slots extending along the longitudinal axis. The support may pivot about a pivot axis at an angle to the longitudinal axis. Further, the carrier may include a ramp adapted to move relative to the support along the longitudinal axis. The ramp may be adapted to slide within the one or more slots of the retention housing. The support may be restricted from pivoting about the pivot axis when the ramp is within the one or more slots and the support may be pivotable about the pivot axis when the ramp is not within the one or more slots.

Yet another embodiment of the present disclosure may provide a carrier for supporting and transporting a recreational vehicle (e.g., a tricycle, a quadracycle, a passenger trailer, etc.). The carrier may include at least two supports positioned apart from one another and extending parallel to one another. Each support may extend between a first end region and a second end region along a longitudinal axis. Each support may include a front portion and a rear portion extending at an angle to the front portion such that a front end of the rear portion is spaced a gap distance from a top surface of the front portion. Each support may be adapted to receive and contact tires of the recreational vehicle. Each support may include one or more slots extending along the longitudinal axis. The carrier may also include at least two ramps corresponding to each of the at least two supports and adapted to move relative to the corresponding support along the longitudinal axis. Each of the at least two ramps may slide within the one or more slots of the corresponding support.

Another embodiment of the present disclosure may provide a carrier for use with a transport trailer for supporting and transporting a bicycle. The carrier may include a support extending between a first end region and a second end region along a longitudinal axis. The support may define a top surface adapted to receive and contact tires of the bicycle. The support may be adapted to pivot relative to the trailer about a pivot axis. The carrier may also include a ramp adapted to move relative to the support along the longitudinal axis. The ramp may be adapted to slide within one or more slots of a retention housing coupled to the trailer. The support may be restricted from pivoting about the pivot axis when the ramp is within the one or more slots and the support may be pivotable about the pivot axis when the ramp is not within the one or more slots.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
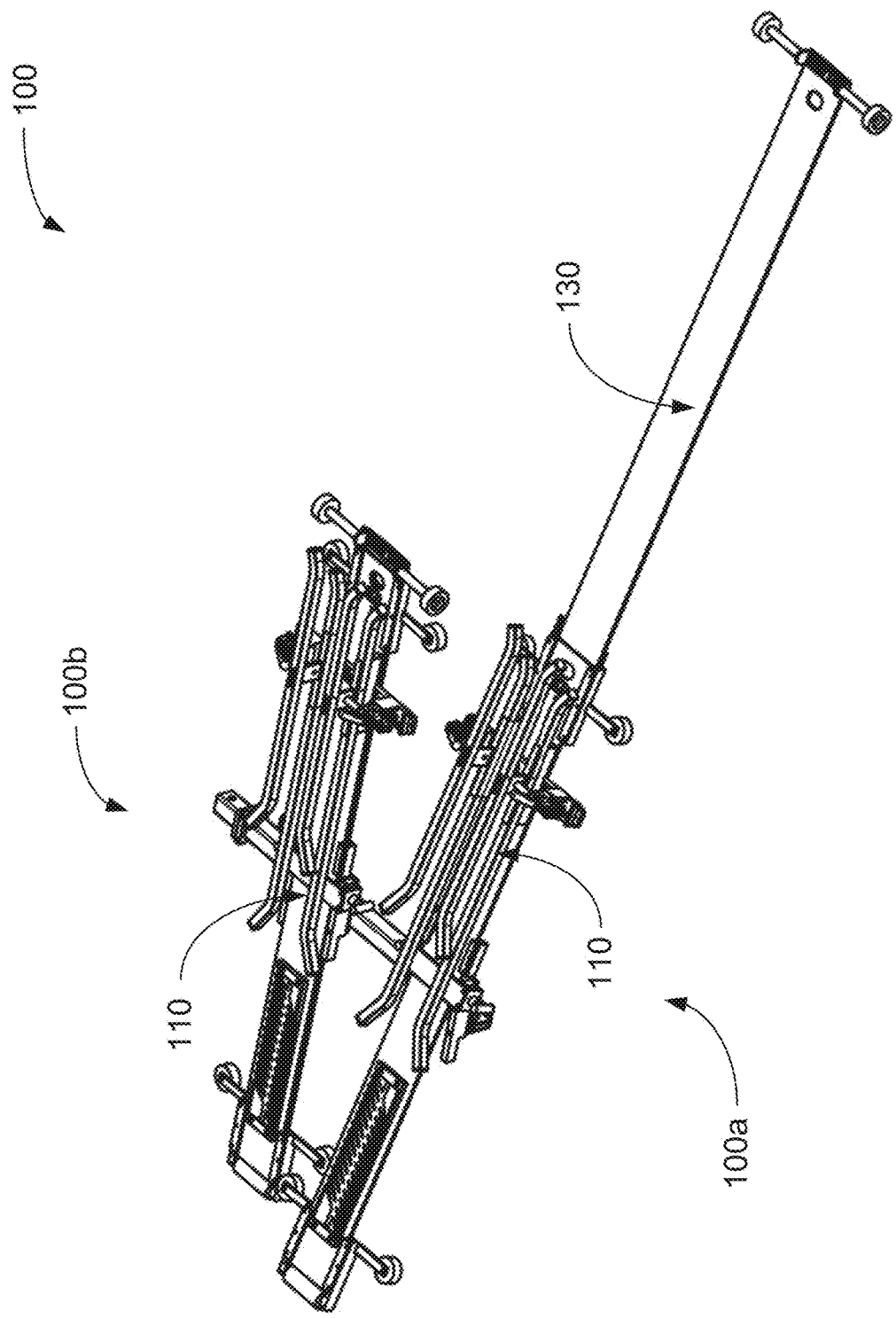
FIG. 1 is a perspective view of two carriers on a hitch shank for supporting and transporting a bicycle, including one in a storage position and one in an extended position, in accordance with embodiments of the present disclosure.

The figures are rendered primarily for clarity and, as a result, are not necessarily drawn to scale. Moreover, various structure/components may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." Furthermore, the terms "having," "including," "comprises" and variations thereof do not have a limiting meaning where these terms appear in this description and claims, and the terms "a," "an," "the," "at least one," and "one or more" are used interchangeably herein. The term "and/or" (if used) means one or all of the listed elements or a combination of any two or more of the listed elements. "I.e." is used as an abbreviation for the Latin phrase id est, and means "that is." "E.g.," is used as an abbreviation for Latin phrase exempli gratia, and means "for example."

Still further, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one sitting on a bicycle, tricycle, or quadracycle positioned on the carrier 100. These terms are used only to simplify the description, however, and not to limit the interpretation of any embodiment described.

Also, as it pertains to the description of the present disclosure, electric bicycle may include any electrically assisted or powered vehicle having wheels on a frame such as for example, a bicycle having two wheels in a single track, a tricycle having three wheels, a quadracycle having four wheels, etc. In other words, any electrically assisted or powered vehicle contemplated herein may be described as a recreational vehicle, an electric bicycle or, more generically, a bicycle. It is further noted, that while the present disclosure pertains to a carrier used with an electric bicycle, any conventional bicycle may similarly be used with the described carrier. Additionally, the present disclosure includes description of a passenger/cargo trailer supported and transported by the carrier described herein. Such carrier may include any suitable passenger/cargo trailer used in conjunction with a bicycle.

Embodiments described and illustrated herein are directed to a carrier for supporting and transporting a bicycle (e.g., an electric bicycle, a conventional bicycle, etc.), a tricycle, a quadracycle, a passenger/cargo trailer, etc. The carrier may be extendable such that the carrier may extend into a ramp for loading a bicycle and retract into a shorter length for storage. As such, the bicycle may roll onto the ramp into a loading position for transporting. Further, in one or more embodiments, the carrier may be adapted to pivot about an axis such that the carrier may be pivoted between a loading position (e.g., with the ramp extended) oriented at an angle to a ground surface and a storage position (e.g., with the ramp retracted) oriented horizontally. In other embodiments, the carrier may be adapted to be slid into and out of an elevated surface (e.g., a truck bed, trailer deck, workstation, etc.) to, for example, form a ramp onto the elevated surface and to support the bicycle when on the elevated surface. As such, the ramp extension may contact the ground surface creating a ramp for the bicycle to load onto the carrier. Also, in some embodiments, the carrier, or components thereof, may be included on a transport or lightweight trailer (e.g., one that is towed by a vehicle).

Additionally, the carrier may include one or more components that may lock the carrier into position. For example, the carrier may be locked to position the carrier in the storage position and prevent the carrier from pivoting. Specifically, the ramp extension may be adapted to act as the lock depending on whether the ramp is extended or retracted. As such, when the ramp extension is extended, the carrier may be allowed to pivot into a position for a bicycle to be loaded on the carrier (e.g., without needing to lift the bicycle). And after the carrier is pivoted back to a generally horizontal position, the carrier may be locked (e.g., by retracting the ramp extension) from pivoting.

The carrier may also include a roller located at an end of the carrier to assist in rolling the carrier into a desired position. For example, when the carrier is positioned on an elevated surface (e.g., a truck bed, trailer deck, workstation, etc.), the roller may assist in moving the carrier along the elevated surface. Specifically, the carrier may be lifted by the end opposite the roller and moved along a surface using the roller (e.g., to position the carrier between a horizontal position and a position extending between the elevated surface and the ground surface). Further, the carrier may include ground engaging members positioned on one or both ends of the carrier that elevate the carrier above the surface the ground engaging members are contacting (e.g., disengaging the roller from contacting the surface). These ground engaging members provide additional stability and traction for the carrier.

In one or more embodiments, the carrier may be configured to receive multiple tires (e.g., positioned on different tracks/paths) from a single recreational vehicle (e.g., a tricycle, a quadracycle, a passenger/cargo trailer, etc.). For example, the carrier may include two or more portions to support the multiple tires of the vehicle. Each of the two or more portions may include two sections spaced apart from one another by a gap such that the tires drop onto one of the sections and are restricted from moving backwards by the other of the sections (e.g., without lifting the tire over the gap). Additionally, each of the two or more portions may include a ramp that extends from and retracts into the corresponding portion such that the ramp may contact the ground and the vehicle can be loaded onto the carrier.

Figure 2:
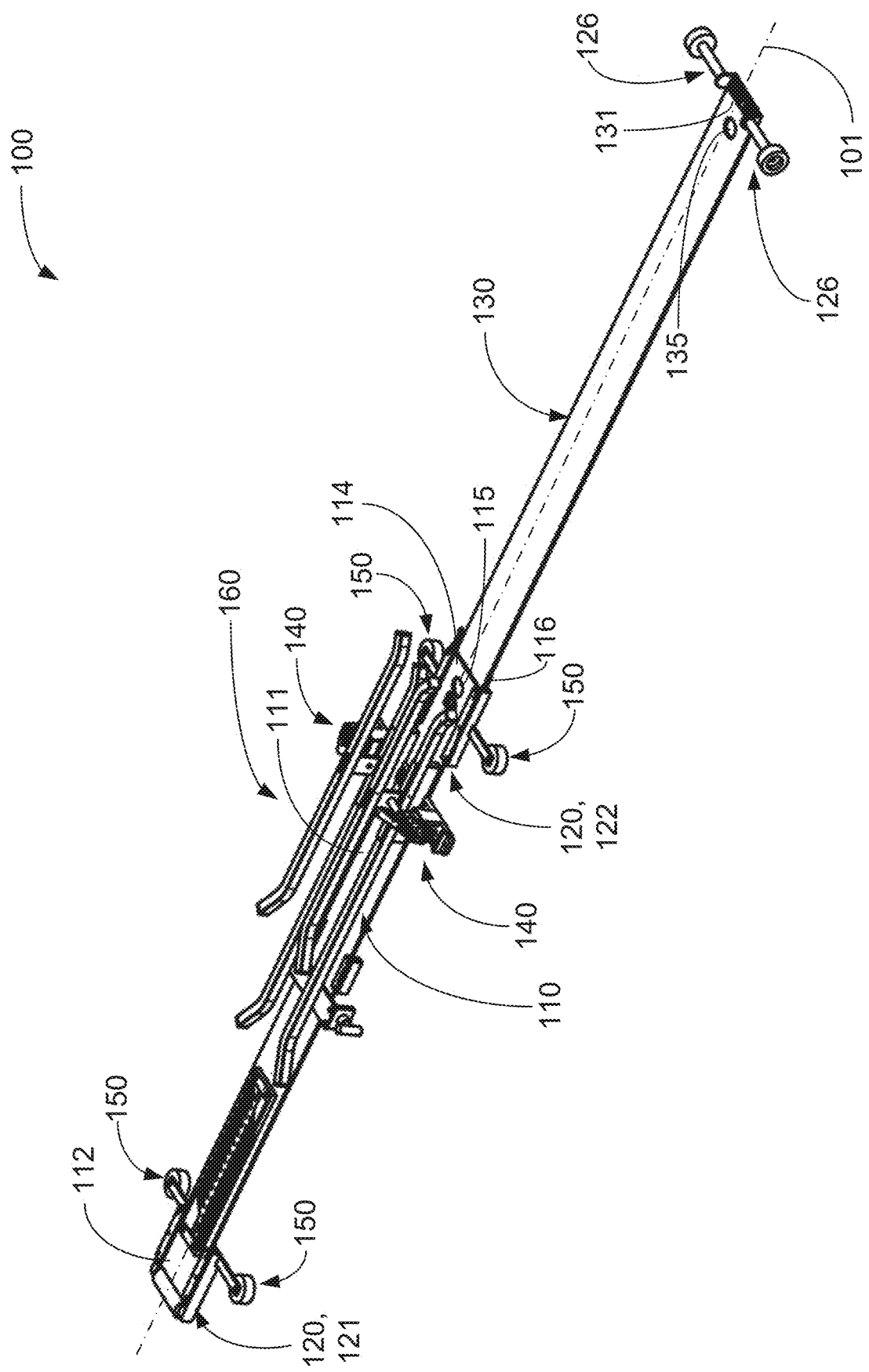
FIG. 2 is an exploded view of a carrier of FIG. 1.

With reference to the figures of the drawing, wherein like reference numerals designate like parts and assemblies throughout the several views, FIG. 1 illustrates two carriers 100 for supporting and transporting a bicycle. Each carrier 100 may include a support 110 extending along a longitudinal axis 101 (e.g., as shown in FIG. 2) and a ramp 130 adapted to move relative to the support 110 along the longitudinal axis 101. The support 110 is adapted to support a bicycle on a top surface 111 (e.g., as shown in FIG. 2) thereof and the ramp 130 is adapted to slide relative to the support 110 to lengthen the carrier 100 and assist in loading the bicycle onto the support 110. For example, the ramp 130 is configurable between an extended position and a storage position. The ramp 130 is extended from the support 110 when in the extended position and the ramp 130 is stowed to coincide with the support 110 when in the storage position.

Specifically, as shown in FIG. 1, a first carrier 100a is configured into the extended position and a second carrier 100b is configured into the storage position. It is noted that either carrier 100 can move between the extended position and the storage position, but FIG. 1 depicts a carrier 100 in each of the positions. The carrier 100 may be pivoted when in the extended position to contact the ramp 130 with a ground surface to provide a continuous path for the bicycle to be loaded onto the carrier 100. In other words, the user may push the bicycle onto the support 110 (e.g., via the ramp 130) along an angled surface formed by the carrier 100 to load the bicycle onto the support 110 without having to lift the bicycle. Thereafter, the user may pivot the carrier 100 into a horizontal orientation and retract the ramp 130 for storing and/or transporting. As such, the process of loading the bicycle onto the carrier 100 may be easier than lifting the bicycle to an elevated support.

In one or more embodiments, the carrier 100 may be locked into position when in the extended position and/or the storage position. For example, when the ramp 130 is retracted into the support 110, the ramp 130 may engage a lock that prevents the carrier 100 from pivoting. Further, in one or more embodiments, the ramp 130 may be locked into position when in the extended position (e.g., using latches) to prevent inadvertent retraction of the ramp 130. As such, the support 110 and ramp 130 may include specific features (e.g., as discussed further herein) that interact to restrict movement of the carrier 100 (e.g., pivoting or extending) when in the storage position and/or the extended position.

FIG. 2 illustrates a single carrier 100 having some of the features of the carrier 100 spaced away from their normal position for better visualization. The carrier 100 may include a support 110 extending between a first end region 112 and a second end region 114 along a longitudinal axis 101. The support 110 may define a top surface 111 adapted to receive and contact tires of the bicycle. In other words, the support 110 may extend along a straight line such that a bicycle tire may travel along the top surface 111 of the support 110 from the second end region 114 towards the first end region 112.

Further, the length of the support 110 may be sufficient to position the multiple tires of the bicycle (e.g., two in-line tires of an electric bicycle) on the top surface 111 of the support 110 (e.g., with any needed extra surface of the support in front of the front tire and rearward of the rear tire). For example, the support 110 may define a length of about 65 inches to about 72 inches measured between the first end region 112 and the second end region 114 along the longitudinal axis 101. The length of the support 110 may also align with the amount of space provided within the bed of a pickup truck (e.g., when the carrier 100 is loaded into the bed) or such that the carrier 100 does not stick out beyond the sides of a vehicle (e.g., when the support 110 is positioned on the vehicle transverse to the direction of motion of the vehicle) such as, e.g., when the carrier 100 is attached to a hitch. Additionally, the support 110 may define a width of about 6 inches to about 12 inches measured perpendicular to the longitudinal axis 101 (e.g., to accommodate any width of bicycle tire).

The support 110 (and components that make up the support) may include (e.g., be formed of) any suitable materials. For example, the support 110 may include metal, plastic, rubber, anodizing, powder coating, natural or synthetic strap, case hardening, weld filler, etc.

Figure 3:
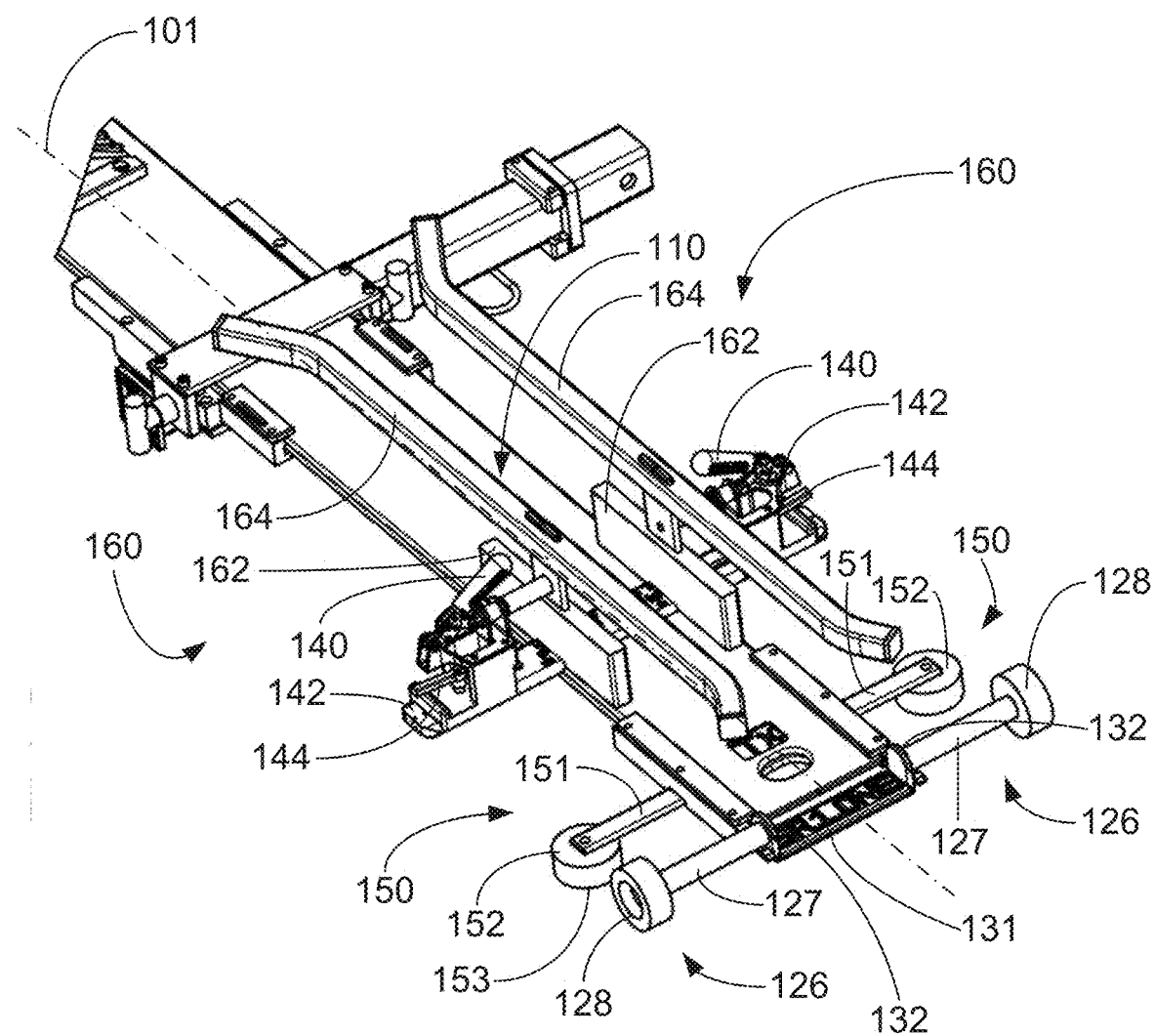
FIG. 3 is an expanded view of a portion of a carrier of FIG. 1.

In one or more embodiments, the carrier 100 may also include a strap (or multiple straps) adapted to extend through or over a tire of the bicycle positioned on the top surface 111 of the support 110. Specifically, the strap may assist in securing the bicycle tire to the support 110 after the bicycle tire is positioned on the support 110 (e.g., by applying a downward force on the tire). The strap may include a chain, a cable, mesh, rubber, nylon, etc. and may be routed through a slot located proximate a pivot mount assembly. In one or more embodiments, the strap may be adapted to extend through or over a front tire of the bicycle proximate the first end region 112 of the support 110. Further, for example, the strap may extend from one side of the support 110, through the bicycle tire (e.g., through the spokes of the tire) or over the bicycle tire, and to the other side of the support 110. In one or more embodiments, the strap may be adjustable (e.g., at one of the sides of the support 110) to easily attach and detach, and to fit a variety of different sized tires. Additionally, in one or more embodiments, the strap may be used to pass over or through the frame of the bicycle to help hold onto the bicycle. In some embodiments, other suitable components may be used to secure the tires to the support 110 including, for example, clamps, etc. Specifically, in one or more embodiments, the carrier 100 may include clamps 140 on either side of the support 110 as shown in FIG. 3 and described further herein.

The carrier 100 may also include a ramp 130 adapted to move relative to the support 110 along the longitudinal axis 101. For example, the ramp 130 may move relative to the support 110 to extend the length of the carrier 100 such that the carrier 100 may create an incline access for a bicycle to be loaded on the carrier 100. In other words, the ramp 130 may be configurable into an extended position (e.g., as shown in FIG. 2) to assist in loading a bicycle on the carrier 100. Additionally, the ramp 130 may be stowed to coincide with the support 110 to minimize the overall length of the carrier 100 when the ramp 130 is not in use. In other words, the ramp 130 may also be configurable into a storage position (e.g., as shown in FIG. 1), e.g., after the bicycle is loaded on the carrier 100 and/or the carrier 100 is in transport.

The ramp 130 may be spaced apart from the support 110 by any suitable distance (e.g., gap distance). For example, the one or more slots 120 (e.g., described further herein) may be defined by the support 110 to guide the ramp 130 at a set distance from the support 110. In other words, the support 110 and the ramp 130 may each extend along a planar surface and the planar surfaces may be generally parallel to one another and spaced a distance apart. Specifically, the ramp 130 may be spaced apart from the support 110 by about 0.1 inches to about 0.5 inches (e.g., about 0.275 inches). In one or more embodiments, the ramp 130 may be positioned closer to the support 110 to minimize the bump therebetween when the bicycle transitions between the ramp 130 and the support 110.

The ramp 130 may define any suitable length to extend the overall length of the carrier 100. Further, the length of the ramp 130, and thereby the carrier 100, may change the angle at which the carrier 100 extends (e.g., making loading and unloading easier) and may provide differing mechanical advantages for pivoting the carrier 100 with a bicycle loaded thereon. In one or more embodiments, the ramp 130 may define a length that is less than or equal to the length of the support 110, e.g., such that that ramp 130 may be stowed to coincide with the support 110. For example, the ramp 130 may define a length that is substantially the same as the length of the support 110. In other embodiments, the length of the ramp 130 may be greater than the length of the support 110 such that the ramp 130 protrudes from an end of the support 110 when in the storage position. Specifically, the ramp 130 may define a length of about 70 inches to about 75 inches measured along the longitudinal axis. Further, the carrier 100 may define an overall length of about 130 inches to about 135 inches when the ramp 130 is in the extended position (e.g., a fully extended position). It is noted that the ramp 130 may be extended from the support 110 by an amount that is less than fully extended (e.g., partially extended) as suitable for a specific application (e.g., if the ramp 130 is extended down to an elevated surface such as a curb or platform).

Figure 15A:
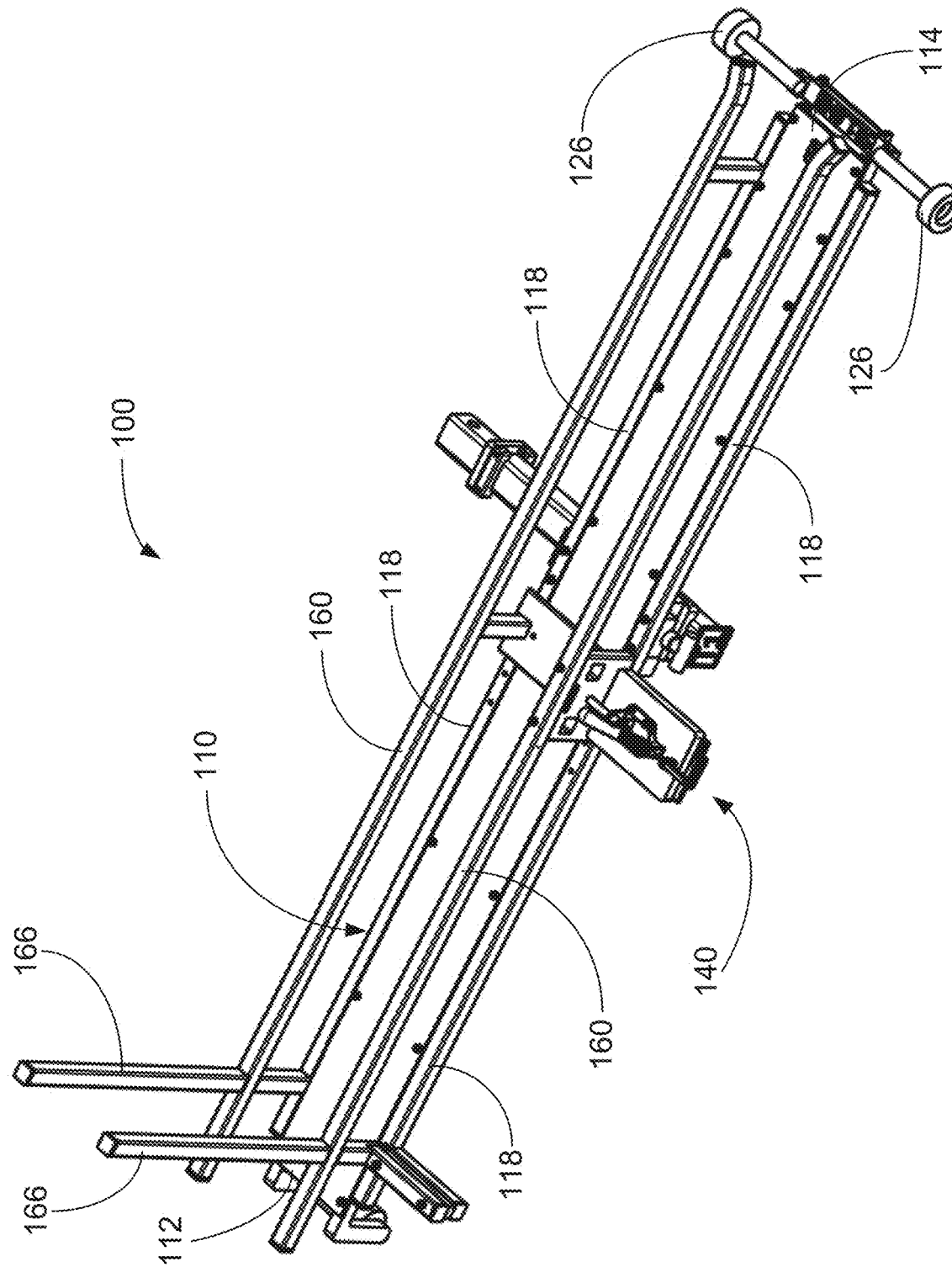
FIG. 15A is top perspective view of another embodiment of the carrier of FIG. 1.
Figure 15B:
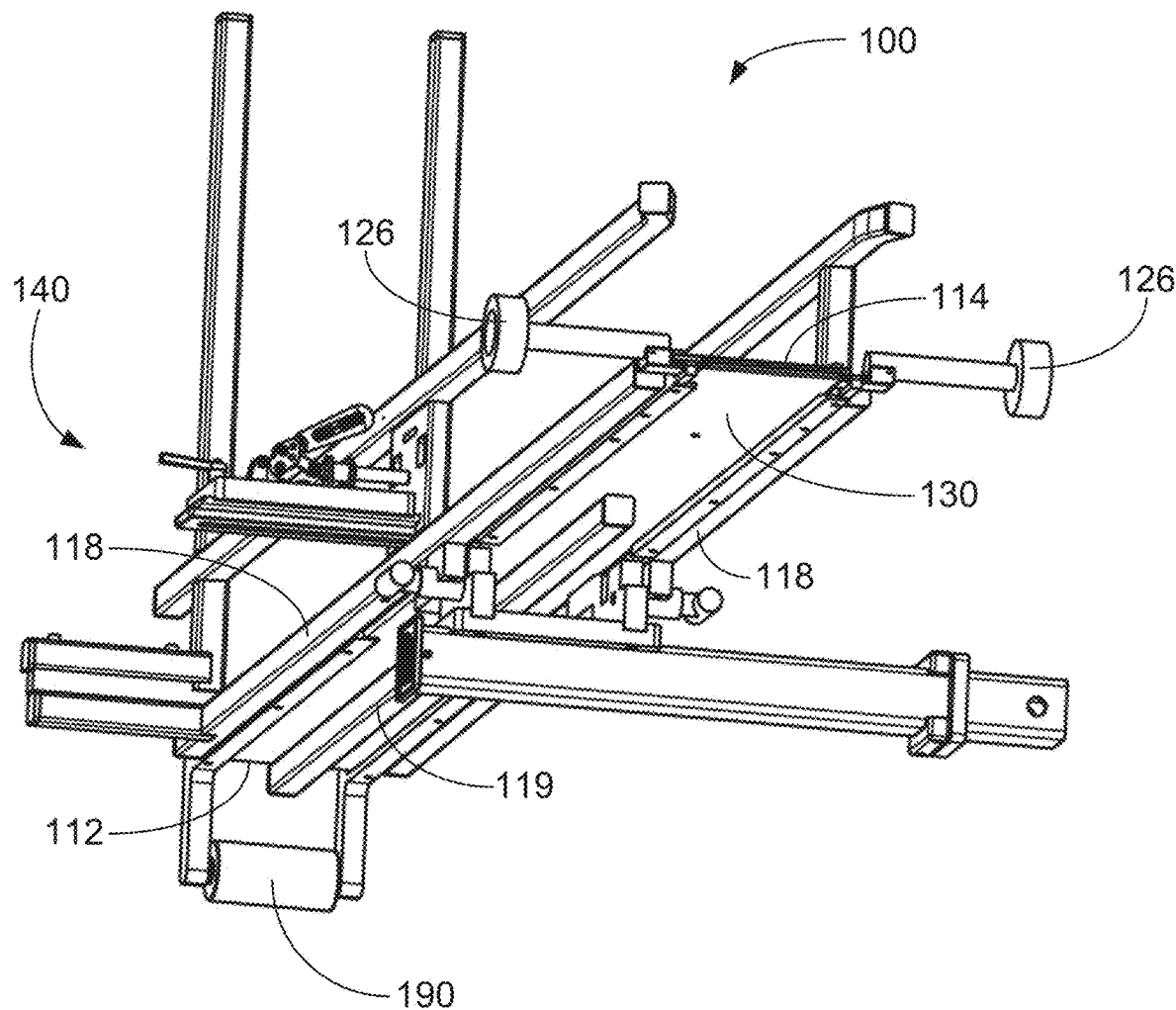
FIG. 15B is a bottom perspective view of the carrier of FIG. 15A.

The ramp 130 (and components that make up the ramp 130) may include (e.g., be formed of) any suitable materials. For example, the ramp 130 may include metal (e.g., aluminum), plastic, rubber, anodizing, powder coating, natural or synthetic strap, case hardening, etc. In one or more embodiments, the ramp 130 (and/or, e.g., other components of the carrier 100) may include one or more support or stiffener rods/tubes extending through (e.g., within) and/or adjacent to (e.g., along the surface) the material of the ramp 130 to, e.g., provide more rigidity. For example, the one or more support or stiffener rods/tubes may be welded to the ramp 130 and/or the support 110. For example, as shown in FIGS. 15A and 15B, the support 110 may include stiffener rods 118 on either side of the support and the ramp 130 may include a stiffener rod 119 along the bottom of the ramp 130. Additionally, the ramp 130 may define any suitable thickness such as, e.g., about 0.25 inches, about 0.5 inches, about 0.75 inches, about 1 inch, etc.

The support 110 may define one or more slots 120 extending along the longitudinal axis 101. In one or more embodiments, the one or more slots 120 may be defined in structures or housing coupled to the sides of the support 110. The ramp 130 may be adapted to slide within the one or more slots 120 of the support 110 to maintain positioning when the ramp 130 moves relative to the support 110. In other words, the ramp 130 may be described as movably coupled to the support 110 because the ramp 130 may move relative to the support 110 without disengaging from the support 110. For example, the side edges of the ramp 130 may slide into opposing slots 120 on an under side of the support 110 to guide the ramp 130 to move relative to the support 110. The one or more slots 120 may be positioned proximate one or both of the first end region 112 of the support 110 and the second end region 114 of the support 110. For example, in one or more embodiments, the one or more slots 120 may include a first set of slots 121 located proximate the first end region 112 of the support 110 and a second set of slots 122 located proximate the second end region 114 of the support 110. In such embodiments having slots at both the first and second end regions 112, 114 of the support 110, the ramp 130 may be evenly supported within the slots 120 of the support 110. In one embodiment, the slots 120 may extend within the support 110 along the entire length of the support 110 (or a majority thereof) between the first and second end regions 112, 114.

In one or more embodiments, the support 110 may also include a stopper adapted to restrict movement of the ramp 130 relative to the support 110 such that the ramp 130 may be prevented from extending beyond the support 110 (e.g., such that the ramp 130 disconnects from the support 110). In other words, the stopper may limit the length of the ramp 130 that can extend from the support 110. The stopper may be located proximate the second end region 114 of the support 110. The stopper may include any suitable components to restrict movement of the ramp 130 relative to the support 110 once the ramp 130 reaches a specific position relative to the support 110. For example, in one or more embodiments, the support 110 may include a protrusion (e.g., a bolt head) that interacts with a protrusion (e.g., a bolt head) located on the ramp 130 to act as a mechanical stop.

In other embodiments, the stopper may be located on the ramp 130 and interact with a feature at the second end region 114 of the support 110.

Similarly, in one or more embodiments, the carrier 100 may include a latch 116 adapted to fix the position of the ramp 130 relative to the support 110 (e.g., as shown in FIG. 2). In other words, while the stopper described herein may prevent the ramp 130 from becoming disconnected from the support 110, the latch 116 may lock the position of the ramp 130 relative to the support 110. As such, the ramp 130 may be prevented from inadvertently extending or retracting relative to the support 110 due to the latch 116. The latch 116 may be positioned at the second end region 114 of the support 110 and interact with the ramp 130 to restrict movement thereof. Further, the latch 116 may fix the position of the ramp 130 relative to the support 110 in various different positions including, e.g., at the farthest extended position of the ramp 130, at the farthest retracted position (e.g., the storage position), or somewhere in between. The amount that the ramp 130 extends from the support 110 may alter the angle that is created by the carrier 100 when pivoted to the ground (e.g., also depending on the height of one end or the middle of the carrier 100 off the ground).

The carrier 100 may also include one or more ground engaging members 126 located proximate an end 131 of the ramp 130 (e.g., extending beyond either side of the ramp 130). For example, the ground engaging members 126 may contact the ground surface when the ramp 130 is in the extended position (e.g., to provide a softer contact with the ground surface). As such, the ramp 130 may more easily traverse the ground and protect the surfaces of the ramp 130 (e.g., from scraping along the ground surface). Additionally, the ground engaging members 126 may maintain the end 131 of the ramp 130 above the ground surface such that it is easier for the user to grasp the end 131 of the ramp 130 to lift and pivot the carrier 100. While the ground engaging members 126 illustrated in FIGS. 2 and 3 extend beyond either side of the ramp 130, the ground engaging members 126 may be positioned relative to the ramp 130 at any suitable position including, e.g., below or underneath the ramp 130, extending beyond the end of the ramp 130, adjacent to the sides of the ramp 130, etc.

The ground engaging members 126 may include any suitable components to space the ramp 130 from the ground surface. For example, the ground engaging members 126 may include wheels, pads, blocks, suction cups, etc. As shown in FIG. 3, each of the ground engaging members 126 include a spindle 127 extending outward from the side of the ramp 130 and a wheel 128 (e.g., a circular rubber bumper) that is adapted to have an anti-skid effect along the ground surface. For example, the wheel 128 may assist in preventing the ramp 130 from sliding when the bicycle is rolled onto the ramp 130. Further, the ramp 130 includes tabs 132 extending upward from each side of the end 131 of the ramp 130 and coupled to the spindles 127. In one or more embodiments, the tabs 132 may act as a guide for the bicycle tire entering the ramp 130 to load onto the carrier 100.

In one or more embodiments, the carrier 100 may include bumper feet 150 located at one or both ends of the support 110. The bumper feet 150 may be adapted to raise the support 110 and ramp 130 above a horizontal surface when placed parallel to the horizontal surface. Therefore, when the support 110 is lifted only on the bumper feet 150, the ramp 130 may move relative to the support 110 (e.g., extending away from and to coincide with) without any hinderance from the horizontal surface (e.g., to move freely). In other words, the bumper feet 150 may be used to provide stability to the carrier 100 by supporting the support 110 only on the bumper feet 150. For example, in some embodiments, the carrier 100 may include various wheels and/or rollers to assist in moving the carrier 100, but the bumper feet 150 space the wheels and rollers above the ground surface when in a resting position (e.g., a storage position) such that the carrier 100 may not slide along the wheels and rollers. Specifically, as described further herein, the carrier 100 may be rolled from an angled position between an elevated surface and the ground surface (e.g., when in the extended position) to the storage position on the elevated surface. The user may be assisted by wheels or rollers to position the carrier 100 onto the elevated surface but, thereafter, the carrier 100 may be rested on the elevated surface and supported by the bumper feet 150 (e.g., and raising the wheels or rollers above the elevated surface). Further, as the ramp 130 is then retracted or stowed to coincide with the support 110, the support 110 may not move along the elevated surface because the support 110 is supported by the bumper feet 150.

As shown in FIG. 2, the carrier 100 includes a pair of bumper feet 150 proximate the first end region 112 of the support 110 and the second end region 114 of the support 110. Specifically, each of the bumper feet 150 may include an arm 151 (as shown in FIG. 3) coupled to the support 110 and extending to a side of the support 110. Further, each of the bumper feet 150 may include a foot 152 coupled to an end of the arm 151 and having a flat surface 153 facing a downward direction (e.g., to contact the surface upon which the carrier 100 is positioned). The bumper feet 150 are sized such that the support 110 may be elevated from a surface upon which the carrier 100 is positioned by about 0.5 inches. Further, the bumper feet 150 may be sized such that the roller 190 (as will be discussed further herein) may be spaced away from the surface by about 0.375 inches (e.g., to prevent the carrier 100 from rolling at an undesired time). Further, the distance from the roller 190 to the surface may be such that the carrier need not be lifted excessively high to engage the roller 190 with the surface. Further, in one or more embodiments, the bumper feet 150 (e.g., the foot or feet 152) may be positioned below or underneath the support 110.

The carrier 100 may also include side rails 160 positioned away from the top surface 111 of the support 110 and extending generally along the longitudinal axis 101. The side rails 160 may be adapted to guide tires of the bicycle onto the support 110 and maintain the tires on the support 110. For example, the side rails 160 may be positioned on each side of the support 110 such that the tires pass between the side rails 160 when loading onto the support 110. Further, the rear tire of the bicycle may be positioned between the side rails when the bicycle is loaded on the carrier 100 (e.g., creating a slot for the tire to be clamped into and vertically supported). Further yet, as will be described further herein, the side rails 160 may be coupled to clamps 140 such that the clamp 140 may move the side rails 160 to contact and hold the rear tire into place.

In one or more embodiments, the side rails 160 may include more than one side rail on either side of the support 110. For example, as shown in FIG. 2, the side rails 160 may include a pair of side rails on each side of the support. Specifically, the side rails 160 may include a lower side rail 162 that is positioned closer to the top surface 111 of the support 110 (e.g., but still spaced apart therefrom) and an upper side rail 164 that is spaced apart from the lower side rail 162. In FIG. 2, the side rails 160 both extend along the longitudinal axis. In FIG. 3, the lower side rail 162 defines a plate (e.g., located at the clamp 140). Having multiple side rails 160 at different elevations may assist in containing the tires of the bicycle and provides more points of contact upon which the side rails 160 may compress on the tire (e.g., when moved by the clamps 140 as described herein). Also, the two level side rails 160 may help to keep the bicycle in an upright position. In one or more embodiments, the side rails 160 may extend generally along the longitudinal axis 101 but may widen or taper at the ends of the side rails 160 to guide a tire of the bicycle through or between the side rails 160.

As shown in FIG. 3, the carrier 100 may include clamps 140 (e.g., a pair of clamps) on either side of the support 110. Specifically, the clamps 140 may be located proximate the second end region 114 of the support 110 and adapted to contact a rear tire of the bicycle. The clamps 140 may be adapted to be moved inward and outward (e.g., through a set clamping motion) relative to the sides of the support 110 to contact the rear tire of the bicycle when the bicycle is loaded on the carrier 100 (e.g., to physically restrict motion of the rear tire). In other words, the pair of clamps 140 may be positioned on either side of the support 110 such that a gap is defined between the pair of clamps 140. As the clamps 140 are engaged (e.g., by engaging one or both of the clamps to move a set distance inward), the gap therebetween may decrease and a tire of the bicycle may be restricted by contact from the clamps 140 on both sides of the tire. As the clamps 140 are disengaged (e.g., by disengaging one or both of the clamps 140 to move a set distance outward), the gap therebetween may increase and the tire of the bicycle may be free to move between the clamps 140. In other words, when the gap distance is less than the width of the tire, the clamps 140 may apply pressure to the tire to restrict it from moving and when the gap distance is greater than the width of the tire, the clamps 140 do not impede motion of the tire. In one or more embodiments (e.g., as described further herein in connection with FIGS. 15A and 15B), the carrier 100 may only include a single clamp 140 on one side of the support 110 and positioned between the first and second end regions 112, 114 (e.g., between the front and rear wheels when the bicycle is positioned on the carrier 100). A single clamp 140 may move relative to a rail positioned on the other side of the support 110 to apply pressure therebetween.

As noted herein, in one or more embodiments, each clamp 140 may be coupled to the side rails 160 (e.g., one or both of the lower and upper side rails 162, 164). Therefore, the side rails 160 may move inward and outward with the clamp 140 to contact the rear tire of the bicycle (e.g., when the clamps 140 are engaged or disengaged). By having the side rails 160 attached to the clamps 140, the rear tire may be contacted by the side rails 160 at multiple locations and may provide more reliable compression on the rear tire (e.g., due to multiple contact points).

Also, the clamps 140 may be adjustable in a variety of different ways. For example, the clamps 140 may be adjusted to move along the longitudinal axis 101 to position the clamps 140 at a desired location along the length of the bicycle. Further, for example, the clamps 140 may be adjusted inward and/or outward (e.g., separate from the clamping motion associated with engaging and disengaging) to set the clamps 140 at an initial position. After the clamps 140 are set into place, the clamps 140 can be engaged or disengaged to move a set distance to clamp or release the tire. Specifically, each of the clamps 140 may be adapted to slide along a plate 142 (e.g., as shown in FIG. 3) in a direction transverse to the longitudinal axis 101. Further, each of the clamps 140 may include a locking lever 144 to fix the clamp 140 to the plate 142, thereby setting the transverse position of the clamp 140 relative to the support 110 (and, e.g., the distance between the clamps 140). In one or more embodiments, the plate 142 may include a scale (e.g., an engraving) to assist in pre-positioning the clamps 140 relative to one another (e.g., the scale may be configured to include increments of known tire widths). Further, in one or more embodiments, the plate 142 may extend above the support 110 to reduce the potential for interference with the ramp 130 that is positioned below the support 110. In embodiments in which the side rails 160 are connected to the clamps 140, the side rails 160 may also move along the longitudinal axis 101 and/or transverse to the longitudinal axis 101.

In one or more embodiments, the support 110 may define a first opening 115 located proximate the second end region 114. Similarly, the ramp 130 may also define a second opening 135 located proximate an end 131 of the ramp 130 that is adapted to correspond with the first opening 115. When the ramp 130 is in the storage position (e.g., when the ramp 130 is stowed relative to the support 110), the first and second openings 115, 135 may align at least partially such that there is an opening that passes through both of the support 110 and the ramp 130. When the first and second openings 115, 135 are at least partially aligned, a locking device (e.g., a rope, a cable, a chain, etc. having a lock attached thereto) may extend through both of the openings 115, 135 to lock the ramp 130 in position relative to the support 110. This locking device may act as a security system to prevent the ramp 130 from being extended by someone other than the intended user. Further, the locking device may prevent the carrier 100 from being separated from the vehicle, trailer, etc. As shown in FIGS. 2 and 3, the first and second openings 115, 135 define an oval shape, but may define any suitable shape (e.g., square, circle, rectangle, etc.).

Also, in one or more embodiments, the second opening 135 of the ramp 130 may also act as a handle (e.g., proximate the end 131 of the ramp 130) to, e.g., provide the user with a handle to assist in moving the ramp 130 relative to the support 110. For example, the user may use the second opening 135 of the ramp 130 to grasp the ramp 130 and extend/retract the ramp 130 relative to the support 110. Further, the wheels 128 or the end 131 of the ramp 130 may be used as a handle to manipulate the ramp 130.

Figure 4:
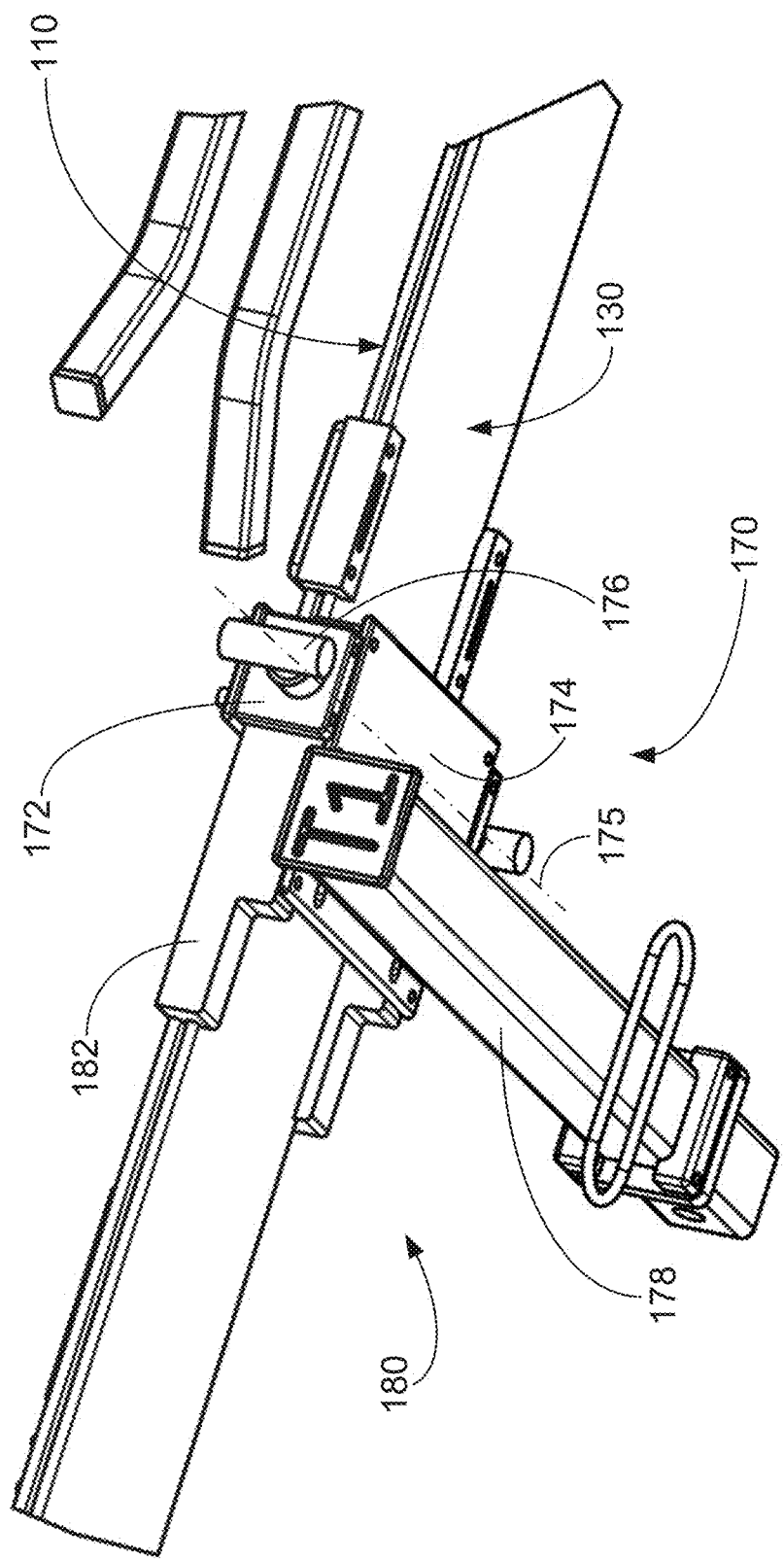
FIG. 4 is an expanded view of another portion of a carrier of FIG. 1.

FIG. 4 illustrates a pivot mount assembly 170 of the carrier 100 that pivots relative (e.g., pivotally coupled) to the support 110 such that the support 110 may pivot into a desired position. In other words, the support 110 may pivot to move between a loading position (e.g., when the carrier 100 is positioned at an angle to the ground surface) and a storage position (e.g., when the carrier 100 is positioned in a generally horizontal position). The pivot mount assembly 170 may include (e.g., be formed of) any suitable materials such as, e.g., plastic, metal, etc. In such embodiments in which the pivot mount assembly 170 includes plastic, metal on metal interactions may be avoided and may assist in positioning the ramp 130 closer to the support 110. Further, the pivot mount assembly 170 may include a support plate 172 fixedly coupled to the support 110 and a mount plate 174 pivotably coupled to the support plate 172. For example, each of the support plate 172 and the mount plate 174 may include features (e.g., knuckles) that intertwine with one another and include a pull pin 176 (e.g., a spring pin) extending through each of the knuckles. Therefore, the mount plate 174 may pivot relative to the support plate 172 about a pivot axis 175 defined by the pull pin 176 of the pivot mount assembly 170. In one or more embodiments, the pull pin 176 may be removable from the mount plate 174 and the support plate 172 (e.g., to easily disassemble components, as described herein). In one or more embodiments, the pull pin 176 may be a fixed pin that is not adapted to be removed.

The pivot axis 175 may be positioned relative to the support 110 perpendicular to the longitudinal axis 101 between the first and second end regions 112, 114. Specifically, in some embodiments, the pivot axis 175 may be positioned just forward of the center of gravity of a bicycle supported on the support 110. As such, the bicycle may not automatically pivot the support 110 to a horizontal position when the bicycle is fully loaded on the support 110, but would only pivot due to the user manually pivoting the support 110. Therefore, due to the position of the pivot axis 175 relative to the center of gravity of the bicycle, the bicycle can be fully loaded on an angled carrier 100 and then the carrier 100 can be pivoted to a generally horizontal position. Although, in other embodiments, the pivot axis 175 may be positioned at or behind the center of gravity of a bicycle supported on the support 110.

When the pull pin 176 is positioned in the knuckles of the mount plate 174 and the support plate 172, the support 110 may pivot about the pivot axis 175, which is at an angle (e.g., perpendicular) to the longitudinal axis 101. When the pull pin 176 is removed from the knuckles of the mount plate 174 and the support plate 172, the support 110 and ramp 130 may be removed from the mount plate 174 for storage purposes (e.g., when the mount plate 174 is attached to a car hitch or trailer as described herein). In other words, the support 110 and ramp 130 may be easily stored without detaching other components that are attached to a vehicle or trailer. It is noted that while the pull pin 176 may be removable to easily attach and detach the support 110 and ramp 130 to and from the pivot components, in one or more embodiments, the pull pin 176 may be fixed (e.g., not removable).

The mount plate 174 may be fixedly coupled to any structure upon which the carrier 100 may be mounted or positioned. For example, the pivot mount assembly 170 may further include a mounting member 178 (e.g., a shank) fixedly coupled to the mount plate 174 and adapted to be inserted into a hitch receiver of a vehicle. As such, the carrier 100 may be inserted into and removed from the hitch receiver of the vehicle as desired. The hitch receiver may be on the front or back of a vehicle such as, e.g., a passenger vehicle, a public transportation vehicle (e.g., mass transit, a bus, train, etc.), a taxi, a self-driving vehicle, a trailer, a camper, a recreational vehicle, etc. The mounting member 178 may include an anti-rattle collar (e.g., two-piece) that may butt-up against the hitch receiver through a rubber anti-rattle rubber gasket that may fit between the collar and the hitch receiver tube. The mounting member 178 may also include a welded on loop to route a security chain or cable through (e.g., this weldment may be case hardened to help restrict cutting off). In one or more embodiments, the mounting member 178 may include an end stop so that if the fastener (e.g., U-bolt) mounting the pivot mount assembly 170 to the mounting member 178 were to unintentionally loosen, the pivot mount assembly 170 may not slide off the mounting member 178.

Figure 12:
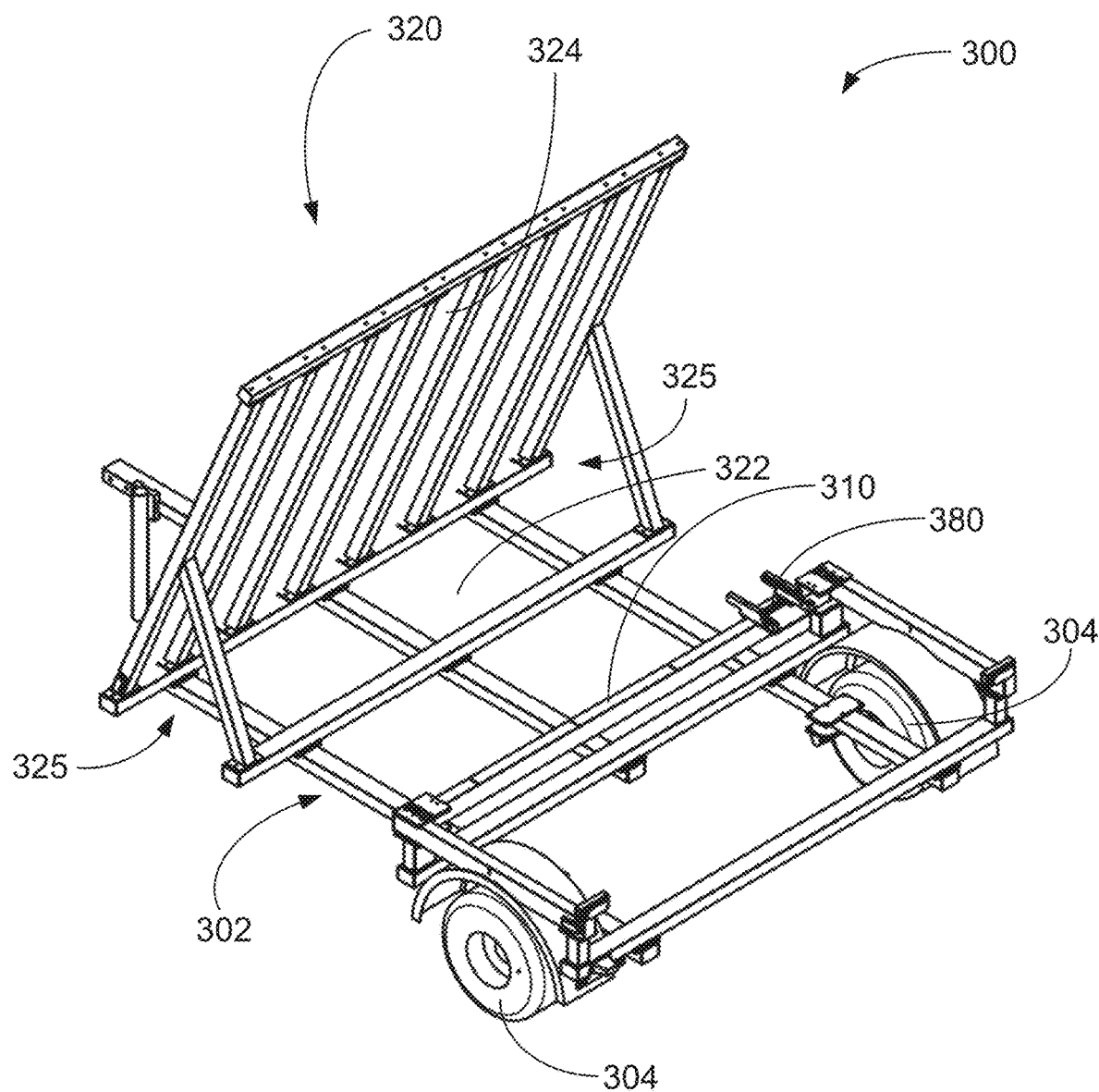
FIG. 12 is a perspective view of a transport trailer including components of a carrier in accordance with embodiments of the present disclosure.

Further, the carrier 100 may pivot while attached to the vehicle so that the user may load the bicycle onto the carrier 100 (e.g., when the carrier 100 is extended through the ramp 130 and contacting the ground surface) for support and transportation (e.g., when the carrier 100 is in the storage position and the bicycle may be restricted thereon). Also, in one or more embodiments, the mount plate 174 may be fixedly coupled to a transport trailer (e.g., the retention housing 380 as shown in FIG. 12) such that the carrier 100 may pivot relative to the transport trailer and load a bicycle onto the carrier 100 to be transported by the transport trailer.

Figure 5:
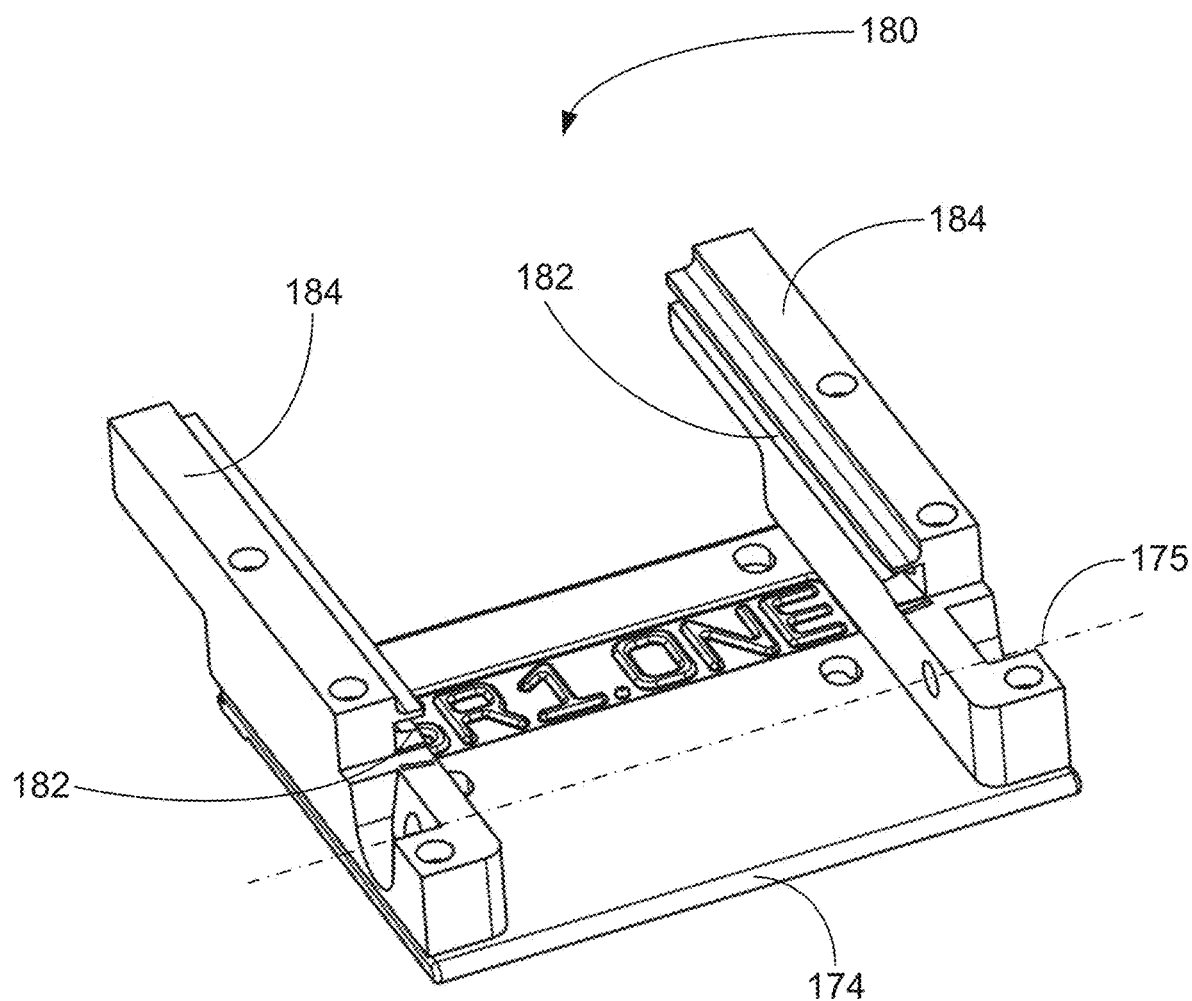
FIG. 5 is an isolated view of a retention housing of a carrier of FIG. 1.

Additionally, the pivot mount assembly 170 may also include a retention housing 180 that defines one or more slots 182 extending along the longitudinal axis 101 (e.g., as shown in FIG. 5). The retention housing 180 may be fixedly coupled to the mount plate 174, as shown in FIG. 4, so that the support 110 and ramp 130 may be able to pivot relative to the retention housing 180. However, the retention housing 180 may also act as a lock for the pivoting motion of the support 110 and ramp 130. For example, the ramp 130 may be adapted to slide within the one or more slots 182 of the retention housing 180. Specifically, the one or more slots 182 of the retention housing 180 may be similar to the one or more slots 120 of the support 110 as described herein. The one or more slots 182 of the retention housing 180 may open inwardly and the retention housing 180 may extend on either side of the ramp 130 (e.g., the slots 182 may be positioned on either side of the ramp 130).

When the ramp 130 is positioned within the one or more slots 182 of the retention housing 180 (e.g., in the storage position), the support 110 may be restricted from pivoting relative to the retention housing 180 (e.g., about the pivot axis 175) because the ramp 130 is constrained by the one or more slots 182. In other words, because the ramp 130 pivots with the support 110, if the ramp 130 is prevented from pivoting due to being positioned in the one or more slots 182 of the retention housing 180, the support 110 (and the carrier 100) cannot pivot. When the ramp 130 is not positioned within the one or more slots 182 of the retention housing 180 (e.g., in the extended position), the support 110 is able to pivot relative to the retention housing 180 (e.g., about the pivot axis 175) to a position in which the ramp 130 contacts the ground surface to load a bicycle. In other words, because the ramp 130 is not restricted by being within the one or more slots 182 of the retention housing 180, the support 110 is free to pivot. Therefore, in one or more embodiments, the ramp 130 may act as a lock to the pivoting of the carrier 100, whether it is in the storage position (e.g., locked) or the extended position (e.g., unlocked). As a result, the pivot lock/unlock may be controlled by movement of the ramp 130, which is easily accessible to the user at the rear of the carrier 100 and does not interfere with a bicycle positioned on the carrier 100.

Further, as shown in FIG. 5, the retention housing 180 may define a top surface edges 184 on both sides (e.g., along the housing that defines the one or more slots 182) that are adapted to restrict the support 110 from pivoting in a direction through the retention housing 180. For example, because the support 110 pivots about the pivot axis 175, the support 110 can freely pivot in one direction, but may be restricted from pivoting in the other direction. Further, the top surface edges 184 of the retention housing 180 may act as a guide for retracting the ramp 130 into the one or more slots 182 of the retention housing 180 because the ramp 130 may be aligned with the one or more slots 182 when the support 110 is in contact therewith. The retention housing 180 may include (e.g., be formed of) any suitable material including, e.g., plastic, metal, etc.

Figure 6:
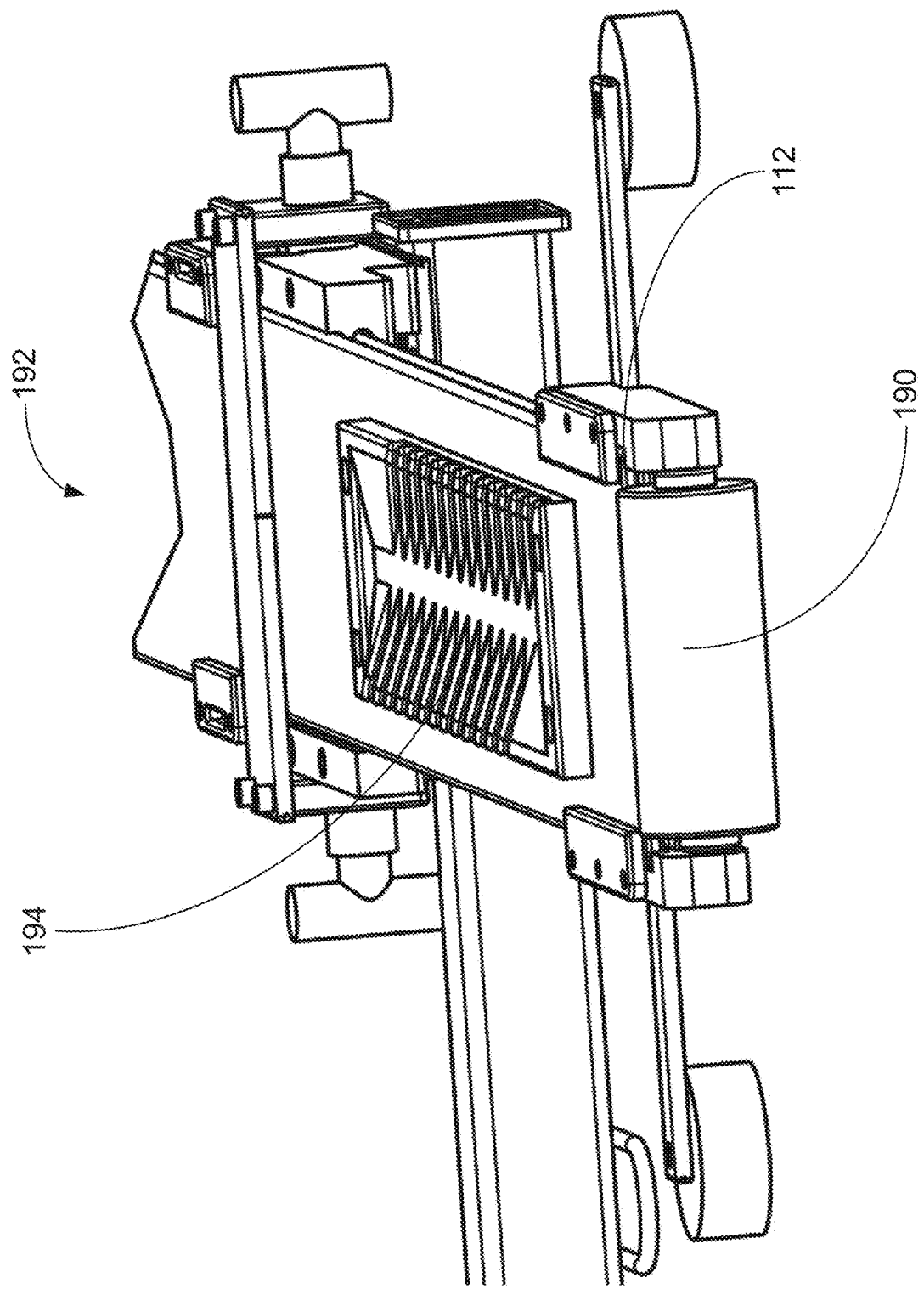
FIG. 6 is an expanded view of yet another portion of a carrier of FIG. 1.

As discussed herein, in one or more embodiments, the carrier 100 may include a roller 190 (e.g., as shown in FIG. 6). The roller 190 may be located proximate the first end region 112, under the support 110 and may be adapted to rotate about an axis perpendicular to the longitudinal axis 101. The roller 190 may be used to move and transport the carrier 100 across a surface. For example, the carrier 100 may be lifted at an angle such that only the roller 190 is in contact with the surface and the carrier 100 can be moved or transported using the roller 190. In one or more embodiments, the roller 190 may extend at least partially beyond the first end region 112 of the support 110.

Further, in one or more embodiments, the support 110 may also include a front tire portion 192 located proximate the first end region 112. The front tire portion 192 may be adapted to contact a front tire of the bicycle loaded on the support 110. The front tire portion 192 may define a plurality of channels 194 (e.g., front wheel slots) to assist in retaining the front tire of the bicycle on the top surface 111 of the support 110 (e.g., by providing traction and grip) when the bicycle is positioned on the carrier 100. In one or more embodiments, the plurality of channels 194 may extend at an angle to the longitudinal axis 101. For example, the plurality of channels 194 may extend at an angle of about 45 degrees to the longitudinal axis 101.

As shown in FIG. 6, the plurality of channels 194 may be concave or V-shaped (e.g., so that the middle is lower than the sides) so that the front wheel may be easier to hold in place. Specifically, in one or more embodiments, the concave or V-shaped portion (e.g., inclined towards the center and the ends of the channels 194 more pronounced) form a surface on which the front wheel may be easier to turn and sit up on the ends of the channels 194 for increased leverage for holding the front wheel in place when the bicycle is strapped down. More specifically, the front fork rake angle may help with the wheel turn retention so the bicycle may not need to be highly forcibly strapped down.

Also, in one or more embodiments, the plurality of channels 194 may help to rotate the front tire into an angled position that helps retain the bicycle on the support 110. Further, by turning the front tire of the bicycle, the overall width of multiple nested bicycles may decrease and the length of the stored bicycle may be reduced.

Figure 7:
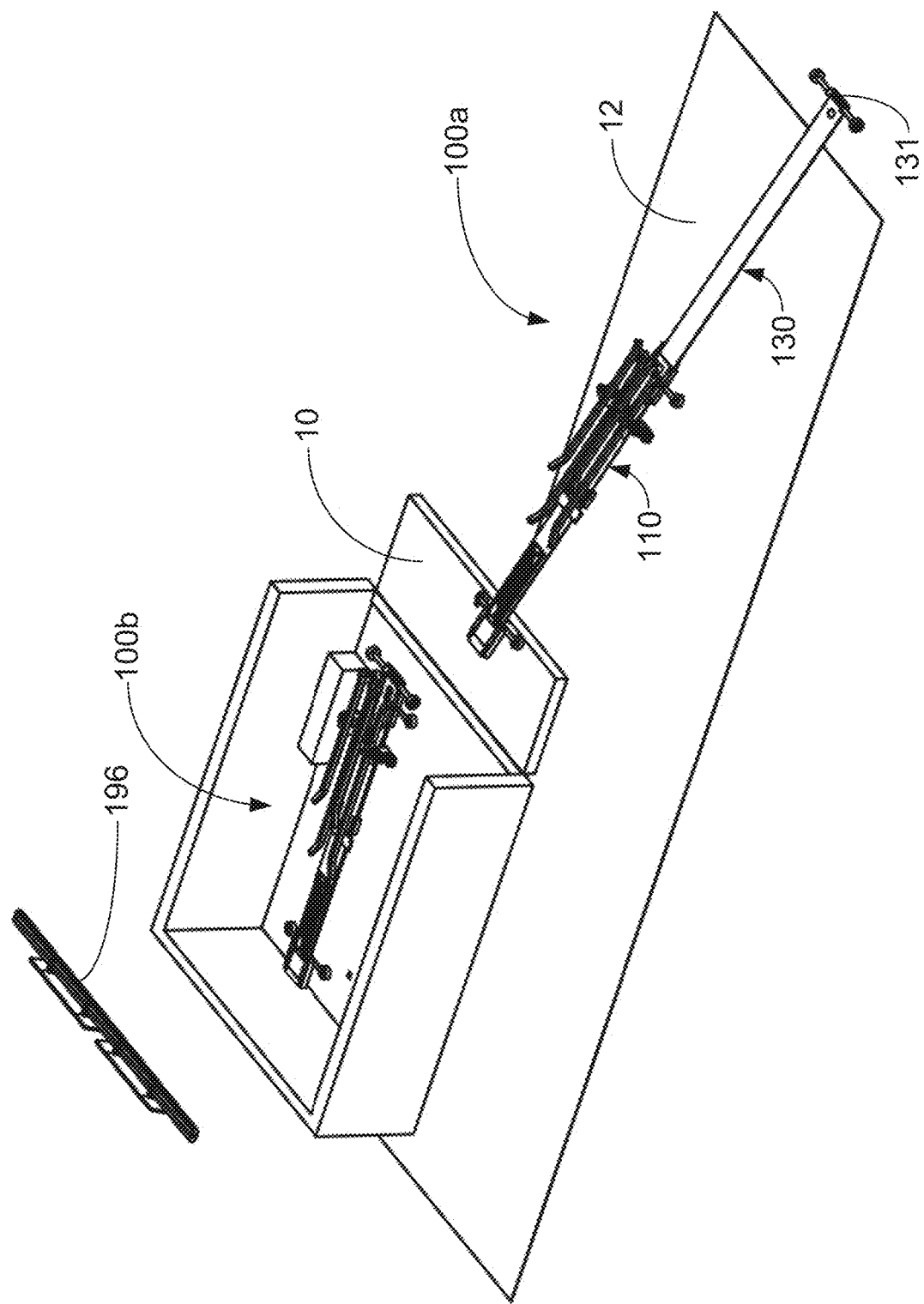
FIG. 7 is a perspective view of two carriers positioned relative to an elevated bed in accordance with embodiments of the present disclosure.

FIG. 7 illustrates two carriers 100 in different positions relative to an elevated surface 10. For example, a first carrier 100a is configured in the extended position and located between the elevated surface 10 and a ground surface 12, and a second carrier 100b is configured in the storage position and located on the elevated surface 10. The first carrier 100a configured in the extended position (e.g., having the ramp 130 extended from the support 110 to create a longer carrier) is ready for a bicycle to be loaded onto the support 110 of the first carrier 100a. The second carrier 100b configured in the storage position (e.g., having the ramp 130 retracted to coincide with the support 110) represents a location when the carrier 100 is loaded onto the elevated surface 10. As such, the carrier 100 provides a dual function of a ramp 130 (e.g., due to the retractable component of the ramp 130) up to an elevated surface 10 and a structure for storing a bicycle (e.g., as compared to two separate components-a ramp to an elevated surface and a bike holder). As shown in FIG. 7, the elevated surface 10 is represented by a truck bed, but any elevated surface 10 is contemplated herein (e.g., including a trailer, a workbench, etc.).

The process of moving the carrier 100 from the extended position (e.g., as shown with the first carrier 100a) to the storage position (e.g., as shown with the second carrier 100b) may include loading the bicycle onto the carrier 100, securing the bicycle to the carrier 100 (e.g., using the straps and/or clamps 140), lifting the end of the ramp 130 until the roller 190 contacts the elevated surface 10, rolling the carrier 100 onto the elevated surface 10, lowering the carrier 100 until supported by the elevated surface 10 (e.g., using the bumper feet 150), and retracting the ramp 130 into the support 110 (e.g., as shown with the second carrier 100b). The process of moving the carrier 100 from the storage position (e.g., as shown with the second carrier 100b) to the extended position (e.g., as shown with the first carrier 100a) may include pulling the ramp 130 from the support 110 to the extended position, lifting the carrier 100 (e.g., via the end 131 of the ramp 130) until the roller 190 contacts the elevated surface 10, rolling the carrier 100 until the first end region 112 of the support 110 is near an edge of the elevated surface 10, lowering the end 131 of the ramp 130 until the end 131 of the ramp 130 is proximate the ground surface 12 (e.g., as shown with the first carrier 100a). These processes may be fully completed by the user while standing on the ground surface 12 (e.g., without climbing onto the elevated surface 10) because the carrier 100 is moved relative to the elevated surface 10 with the bicycle loaded thereon.

Also illustrated in FIG. 7 is a bike facing fairing 196 positioned forward and elevated relative to the second carrier 100b. For example, as shown in FIG. 7, the bike facing fairing 196 may be mounted to a truck rack cross bar. The bike facing fairing 196 may be adapted to break the wind or weather (e.g., flowing over the cab of the truck) to protect the electronics and mechanisms often located on handlebars of electronic bicycles.

FIGS. 8-11 illustrate another embodiment of a carrier 200 for supporting and transporting a multiple track recreational vehicle (e.g., a tricycle, a quadracycle, a trailer, etc.). It is noted that the carrier 200 illustrated in FIGS. 8-11 shares many features that are described in connection with the carrier 100 illustrated in FIGS. 1-7.

Figure 8:
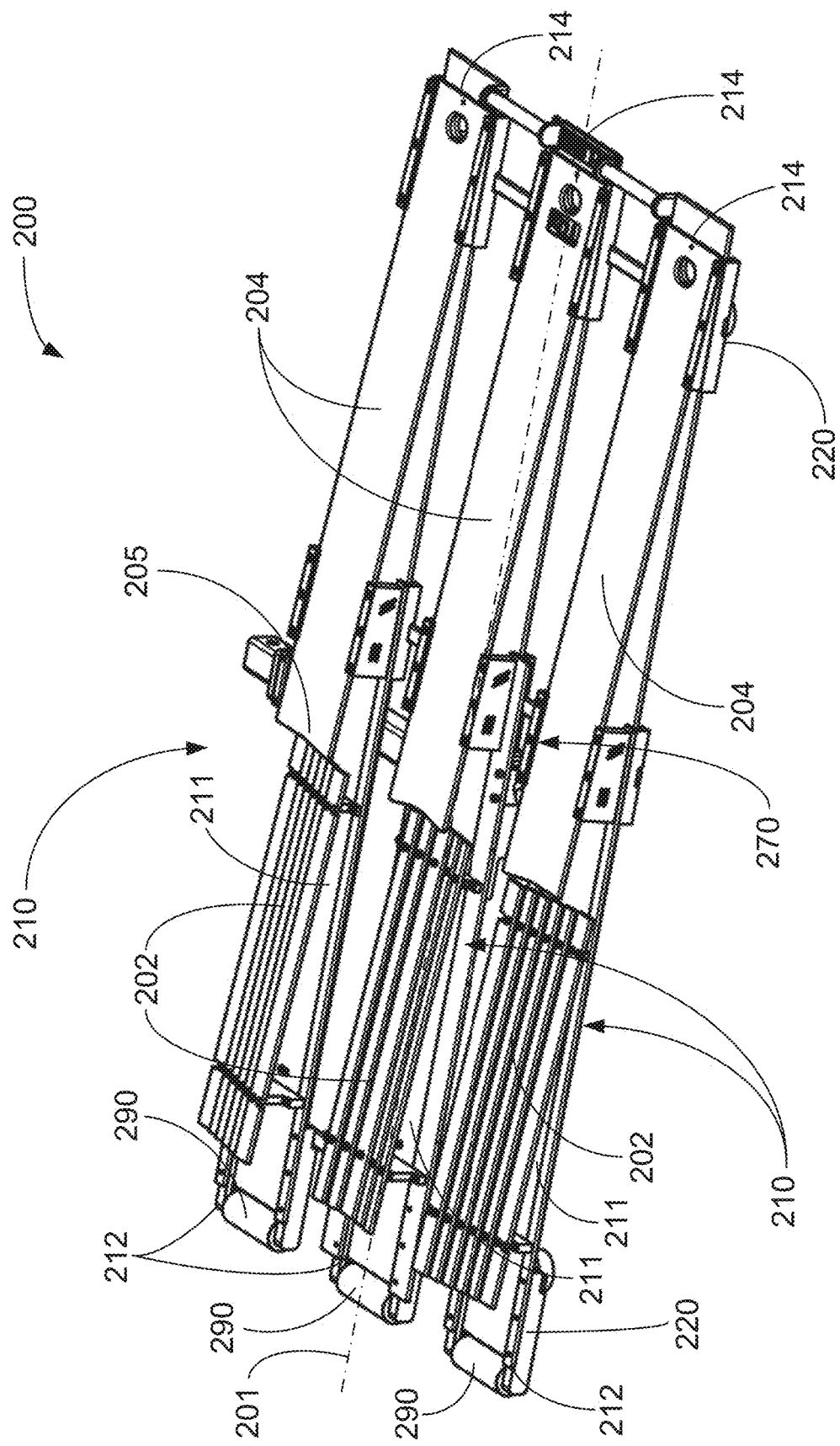
FIG. 8 is a perspective view of a carrier for supporting and transporting a tricycle, quad, or trailer in accordance with embodiments of the present disclosure.

The carrier 200 may include at least two supports 210 positioned apart from one another and extending parallel to one another. As shown in FIG. 8, the carrier 200 may include three supports 210 to carry tires (e.g., three tires) positioned along three separate tracks (e.g., each tire arranged on its own track). In some embodiments, there may be only two separate tracks (e.g., two or more tires arranged on two separate tracks) positioned on two of the three supports 210 (e.g., the two outside supports, the left and middle supports, or the right and middle supports). In other embodiments, the carrier 200 may only include two supports, four supports, five supports, etc. to carry any number of tires arranged along any number of tracks. In one or more embodiments, the supports 210 of the carrier 200 may be separable from each other.

Also, in one or more embodiments, the supports 210 may be adjusted relative to one another (e.g., closer to one another or farther away from one another) to specifically fit any tire spacing. In other words, the user may adjust the carrier 200 to the appropriate support width for a given recreational vehicle.

Each of the supports 210 may extend between a first end region 212 and a second end region 214 along a longitudinal axis 201 (e.g., parallel to the longitudinal axis 201). Each of the supports 210 may be adapted to receive and contact tires of the multiple track recreational vehicle (e.g., tricycle, quadracycle, trailer, etc.). For example, in some embodiments, the supports 210 may interact with a single tire or multiple tires (e.g., front and back tires along a single track).

Figure 9:
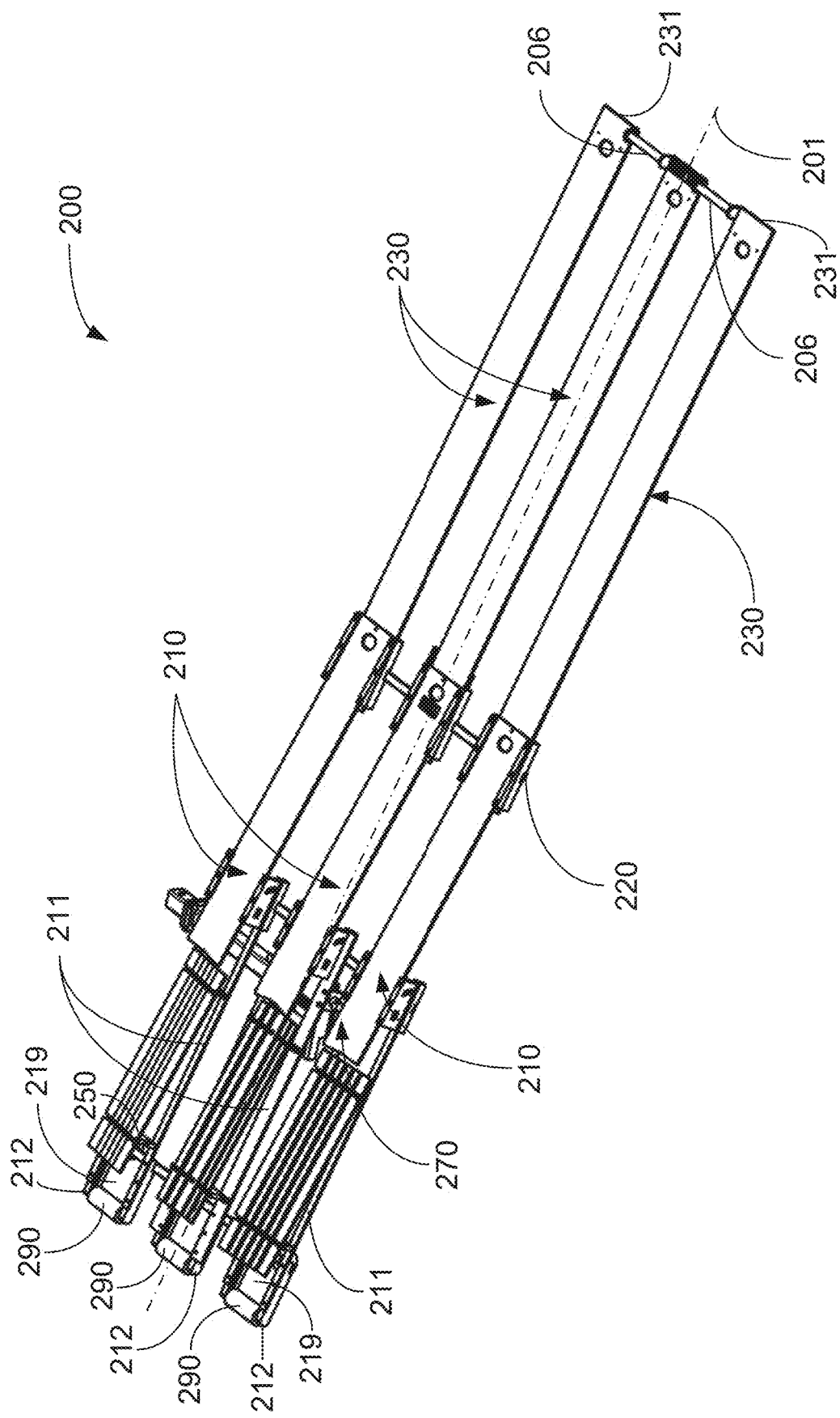
FIG. 9 is a perspective view of the carrier of FIG. 8 in an expanded and pivoted position.

Further, each of the supports 210 may include a front portion 202 and a rear portion 204 extending at an angle to horizontal such that a front end 205 of the rear portion 204 is spaced a gap distance from the front portion 202. As such, a front tire traveling along the support 210 from the rear portion 204 to the front portion 202 may drop down the gap when transitioning from the rear portion 204 to the front portion 202. The angled rear portion 204 and gap between rear portion 204 and the front portion 202 may help secure the front tire on the front portion 202. For example, the front tire may easily drop down from the rear portion 204 to the front portion 202 when loading the front tire on the support 210, but when removing the front tire from the support 210, the front tire may have to overcome the gap (e.g., by lifting or applying increased force) to move the front tire backwards for unloading. Further, in one or more embodiments (e.g., as shown in FIGS. 8 and 9), the front portion 202 may include a ramp angled upwards (e.g., towards the first end region 112) and supported on the top surface 211. The ramp may help support the front wheel of the bicycle by forcing the wheel back towards the front end 205 of the rear portion 204. Further, in one or more embodiments, the ramp on the front portion 202 may define channels that extend parallel to the longitudinal axis to assist in maintaining the front wheel in place.

In one or more embodiments, the carrier 200 may include stepped inclining centering bars located proximate the front portion 202 of the support 210. The stepped inclining centering bars may assist in restricting the recreational vehicle from moving side to side when the vehicle is strapped down. Also, the stepped inclining centering bars may be inclined to form a slope such that the vehicle may be prevented from moving forward (e.g., similar to the incline of the rear portion 204).

Similar to the other carrier 100 (e.g., described in connection with FIGS. 1-7)), each support 210 of the carrier 200 may include one or more slots 220 extending along the longitudinal axis 201. Also, the carrier 200 may include at least two ramps 230 corresponding to each of the at least two supports 210 and adapted to move relative to the corresponding support 210 along the longitudinal axis 201. Specifically, each of the at least two ramps 230 may slide within the one or more slots 220 of the corresponding support 210.

The at least two ramps 230 may be configurable between an extended position (e.g., as shown in FIG. 9) and a storage position (e.g., as shown in FIG. 8). For example, the ramps 230 are extended from the supports 210 so that a recreational vehicle (e.g., tricycle, quadracycle, trailer, etc.) may be loaded on the carrier 200 and the ramps 230 are stowed to coincide with the supports 210 when in the storage position to store and/or transport the recreational vehicle.

Further, the length of the at least two supports 210 may be sufficient to position the tires of the recreational vehicle on the top surface 211 of the support 210 (e.g., with any needed extra surface of the support 210 in front of the front tire and rearward of the rear tire). For example, the at least two supports 210 may define a length of about 72 inches measured between the first end region 212 and the second end region 214 along the longitudinal axis 201. The length of the at least two supports 210 may also align with the amount of space provided within the bed of a pickup truck (e.g., when the carrier 200 is loaded into the bed) or such that the carrier 200 does not stick out beyond the sides of a vehicle (e.g., when the at least two supports 210 are positioned on the vehicle transverse to the direction of motion of the vehicle) such as, e.g., when the carrier 200 is attached to a hitch. Additionally, each of the supports 210 may define a width of about 6 inches to about 12 inches measured perpendicular to the longitudinal axis 201 (e.g., to accommodate any width of bicycle tire) and the overall width of a carrier 200 including three supports 210 may be about 32 inches. It is noted that portions of the recreational vehicle may be wider than the carrier 200 and those portions may overhang the carrier 200.

The at least two ramps 230 may define any suitable length to extend the overall length of the carrier 200. Further, the length may change the angle at which the carrier 200 extends (e.g., making loading and unloading easier) and may provide differing mechanical advantages for pivoting the carrier 200 with a recreational vehicle loaded thereon. In one or more embodiments, the at least two ramps 230 may define a length that is less than or equal to the length of the at least two supports 210, e.g., such that that ramp 230 may be stowed to coincide with the support 210. For example, the at least two ramps 230 may define a length that is substantially the same as the length of the at least two supports 210. In other embodiments, the length of the at least two ramps 230 may be greater than the length of the at least two supports 210 such that the at least two ramps 230 protrude from an end of the at least two supports 210 when in the storage position. Specifically, the at least two ramps 230 may define a length of about 65 inches to about 72 inches measured along the longitudinal axis. Further, the carrier 200 may define an overall length of about 132 inches to about 135 inches when the at least two ramps 230 are in the extended position.

As shown in FIGS. 8 and 9, the carrier 200 may include a cross bar 206 coupled to an end 231 of each of the at least two ramps 230 to maintain spacing between the at least two ramps 230 and synchronize movement of each of the at least two ramps 230. In other words, the ramps 230 move together when extended and retracted such that, e.g., when one ramp is moved, the other ramp(s) move the same. Further, the cross bar 206 maintains the spacing between the ramps 230 such that the tires of the recreational vehicle can move along the ramps 230 and maintain contact with the ramps 230. It is noted that the cross bar 206 may also be used as a handle to extend and retract the ramps 230.

Further, in one or more embodiments, the carrier 200 may include rollers 290 located proximate the first end region 212 of each of the at least two supports 210. The roller 290 may be adapted to rotate about an axis perpendicular to the longitudinal axis 201 to roll the carrier 200 along a surface for transportation or positioning (e.g., similar to as described in connection with carrier 100). Additionally, in one or more embodiments, the front portion 202 of each of the at least two supports 210 may define an opening 219 proximate the first end region 212. The openings 219 may help reduce the overall weight of the carrier 200.

Similar to the carrier 100 described in FIGS. 1-7, the carrier 200 may include a feature that allows the carrier 200 to pivot about a pivot axis in such embodiments when the carrier 200 is positioned on a hitch mount or bar (e.g., for use with a pull-behind trailer). For example, the carrier 200 may include a pivot mount assembly 270 pivotably coupled to one support of the at least two supports. Also, the pivot mount assembly 270 may include a retention housing and an axis. The retention housing may define one or more slots extending along the longitudinal axis 201. The support 210 may pivot about an axis transverse to the longitudinal axis 201. The ramp 230 corresponding to the one support 210 may be adapted to slide within the one or more slots of the retention housing. The one support 210 may be restricted from pivoting about the axis when the ramp 230 is within the one or more slots and the one support 210 may be pivotable about the axis when the ramp 230 is not within the one or more slots.

In one or more embodiments, the carrier 200 may include more than one pivot mount assembly (e.g., one corresponding to each of the at least two supports) such that each support 210 may include a pivot point. It is noted that only one of the pivot mount assemblies may lock and unlock the carrier from pivoting (e.g., so that the carrier may not include multiple locks on the same carrier). Although, in some embodiments, the carrier may include multiple pivot mount assemblies that lock and unlock the carrier from pivoting.

Figure 10:
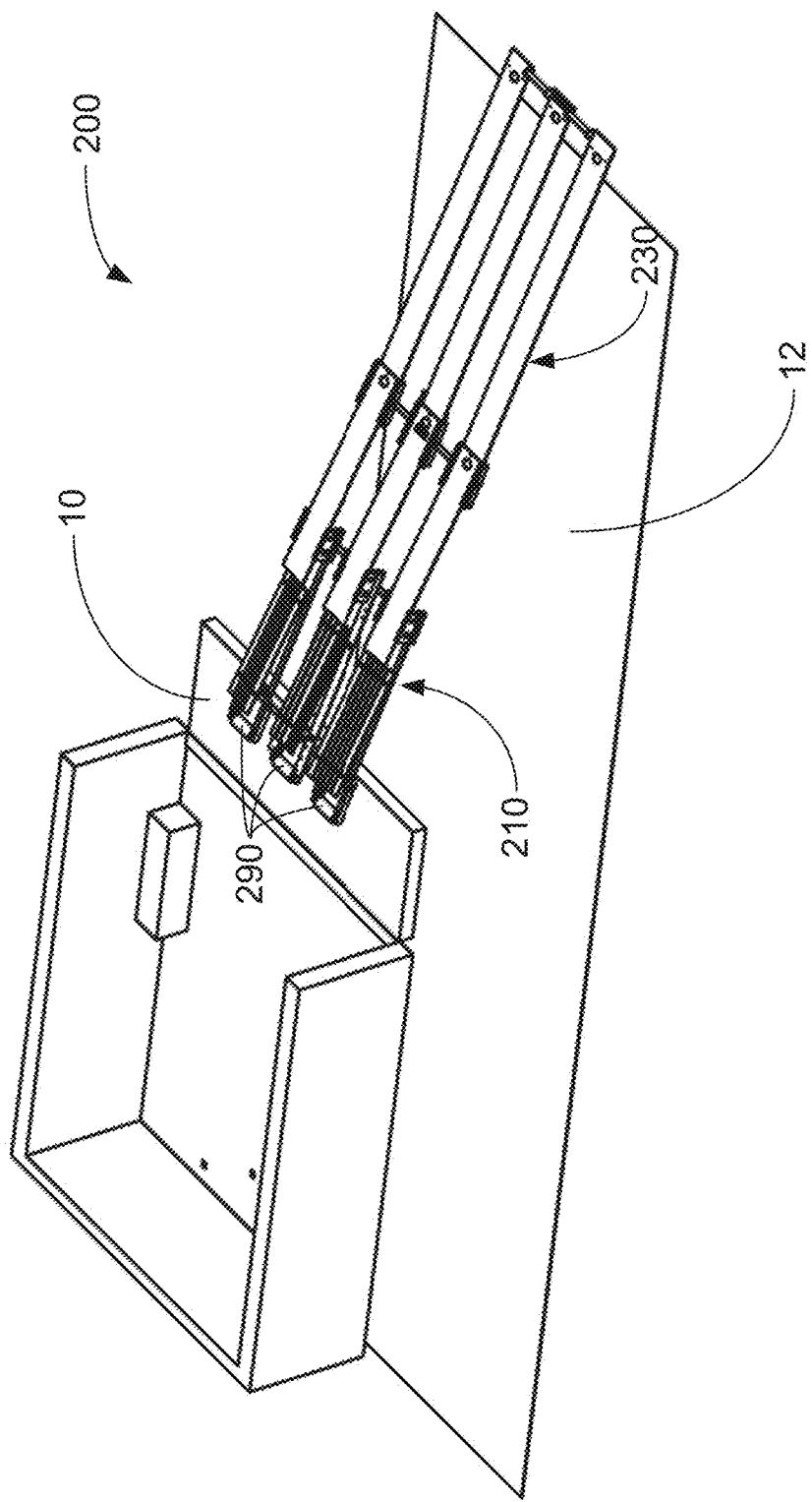
FIG. 10 is a perspective view of the carrier of FIG. 9 positioned relative to an elevated bed.
Figure 11:
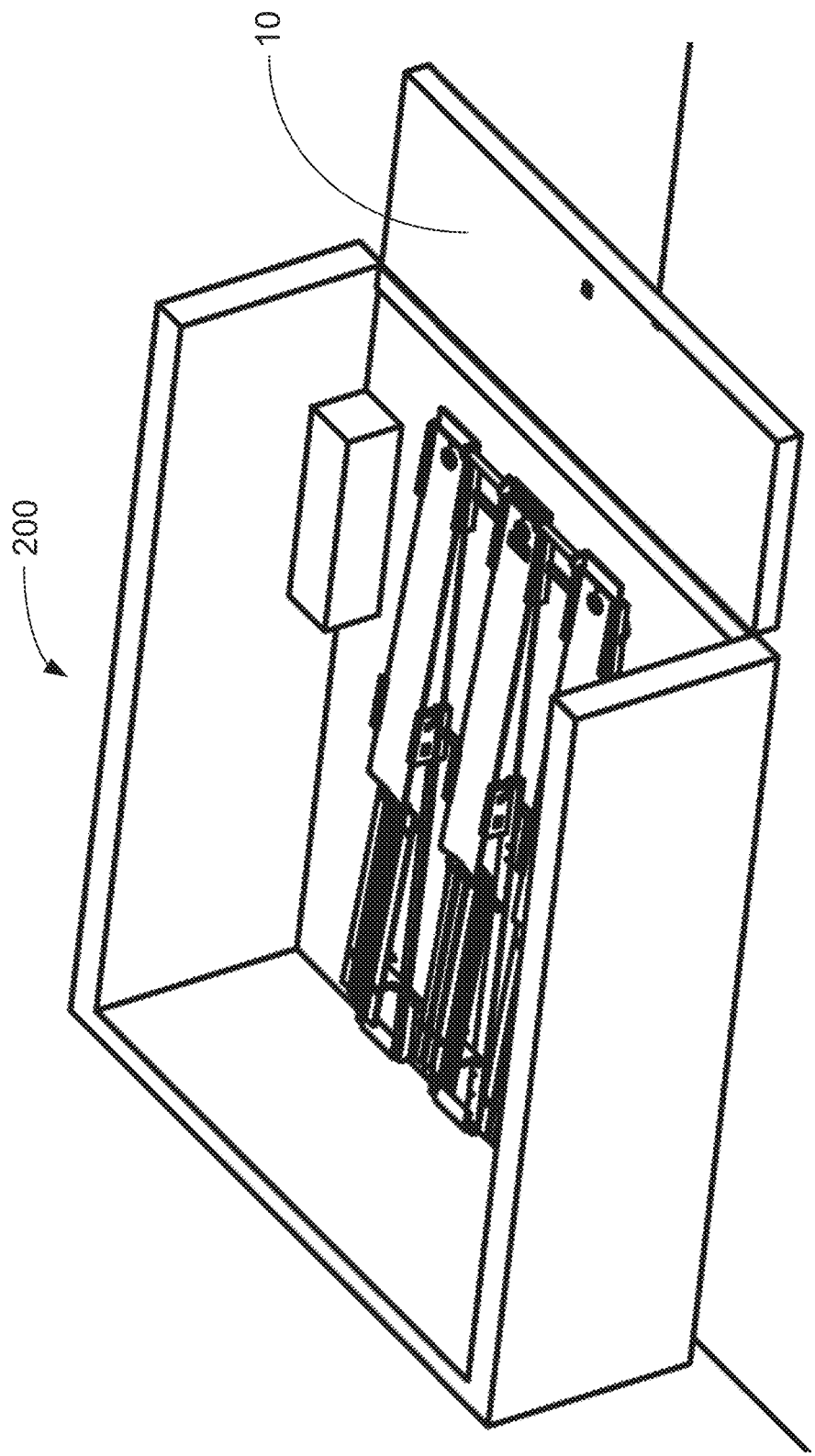
FIG. 11 is a perspective view of the carrier of FIG. 10 in a storage position.

Also, similar to the carrier 100 illustrated in FIGS. 1-7, the carrier 200 may be positioned relative to an elevated surface 10. For example, as shown in FIG. 10, the carrier 200 may be positioned between an elevated surface 10 (e.g., a truck bed, a trailer deck, a workstation, etc.) and a ground surface 12 when the carrier 200 is in an extended position (e.g., having the ramps 230 extended from the supports 210) such that a vehicle can be loaded onto the elevated surface via the carrier 200. As shown in FIG. 11, the carrier 200 may be positioned on the elevated surface 10 in a storage position (e.g., having the ramps 230 retracted to coincide with the supports 210). Further, the rollers 290 of the carrier 200 may assist in rolling the carrier 200 along the elevated surface 10 to transition between the storage position and the extended position. Further yet, similar to the carrier 100, the carrier 200 may include bumper feet 250 to support the carrier 200 on the elevated surface 10.

In one or more embodiments, the carrier 200 may include one or more straps to secure the recreational vehicle thereon. For example, the carrier 200 may include dual straps originating from about the center of the carrier 200. The first strap may be wrapped around the center of the recreational vehicle in a vertical plane, and together with the front stepped profiles, may prevent the recreational vehicle from moving side to side. Further, in combination with the rear inclined floors and the increasing heights of the front step profiles, the recreational vehicle may be prevented from moving forward. The second strap may extend from the center of the carrier 200 and angled back around the rear of the recreational vehicle to hold the vehicle forward against the inclines so the vehicle cannot move backwards.

FIG. 12 illustrates a transport trailer 300 that may be hauled behind a passenger vehicle and may include a carrier (e.g., the carrier 100 of FIGS. 1-7 and/or the carrier 200 of FIGS. 8-11) coupled thereto. For example, the trailer 300 may include a frame 302 that is attached to the passenger vehicle using a hitch mount/coupler and also supported above a ground surface by wheels 304. Further, the trailer 300 may have at least one crossmember 310 extending transversely and adapted to support the carrier 100, 200 (and/or, for example, a conventional bicycle carrier). In other words, the trailer 300 may act as a bike rack on wheels (e.g., by detaching the trailer 300 from the towing vehicle and positioned somewhere to be used as a bike rack) due to the carrier 100, 200 positioned on the trailer 300. For example, in one or more embodiments, the trailer 300 may be attached to a hitch ball attached to a wall (e.g., a wall in a garage) or on a post to be used as a bike rack when not connected to a towing vehicle. In one or more embodiments, the carrier 100 and/or carrier 200 may be not include a ramp or pivotability and may be used similar to a conventional bicycle carrier (e.g., the bicycle is lifted into place onto the carrier). These non-pivotable and no ramp carriers may be used in any configurations as described herein (e.g., in a truck bed, on a trailer 300, on an elevated surface, etc.).

Specifically, as shown in FIG. 12, a retention housing 380 of a pivot mount assembly (e.g., as described herein) may be fixedly coupled to the crossmember 310 of the trailer 300 (e.g., using any suitable fastener such as a U-bolt). Further, the remaining components of the carrier 100, 200 may be pivotably coupled to the retention housing 380. Therefore, the carrier 100, 200 may be pivotable relative to the retention housing 380 (e.g., and the crossmember 310 of the trailer 300) and also pivotably lockable relative to the retention housing 380 (e.g., by extending or retracting the ramp as described herein). The carrier 100, 200 may be adapted to pivot such that an end of the ramp is touching the ground surface such that the vehicle can be loaded onto the carrier 100, 200, and the carrier 100, 200 may be pivoted to a generally horizontal position for transporting the vehicle.

Figure 13A:
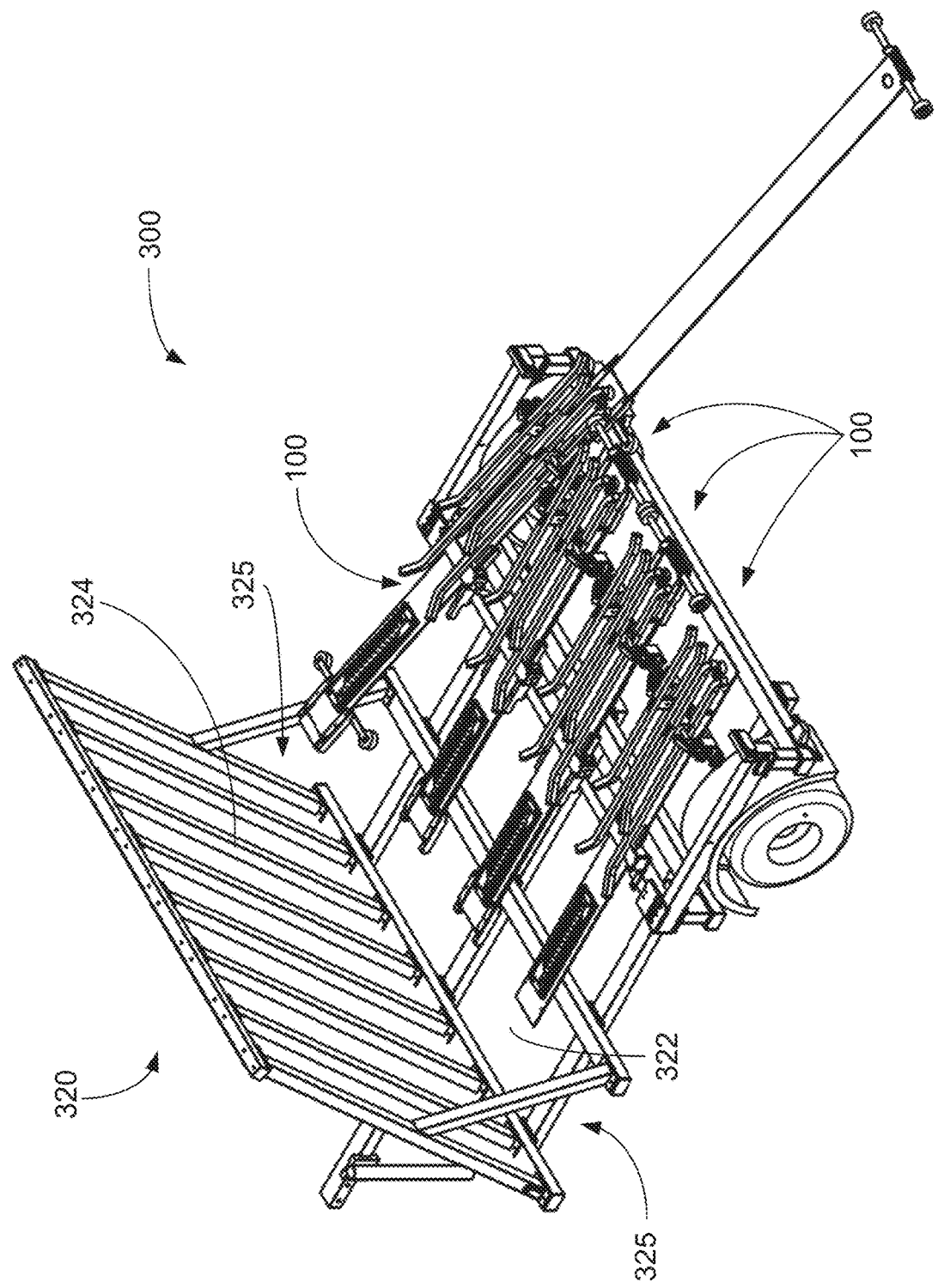
FIG. 13A is a perspective view of the transport trailer of FIG. 12 having multiple carriers.
Figure 13B:
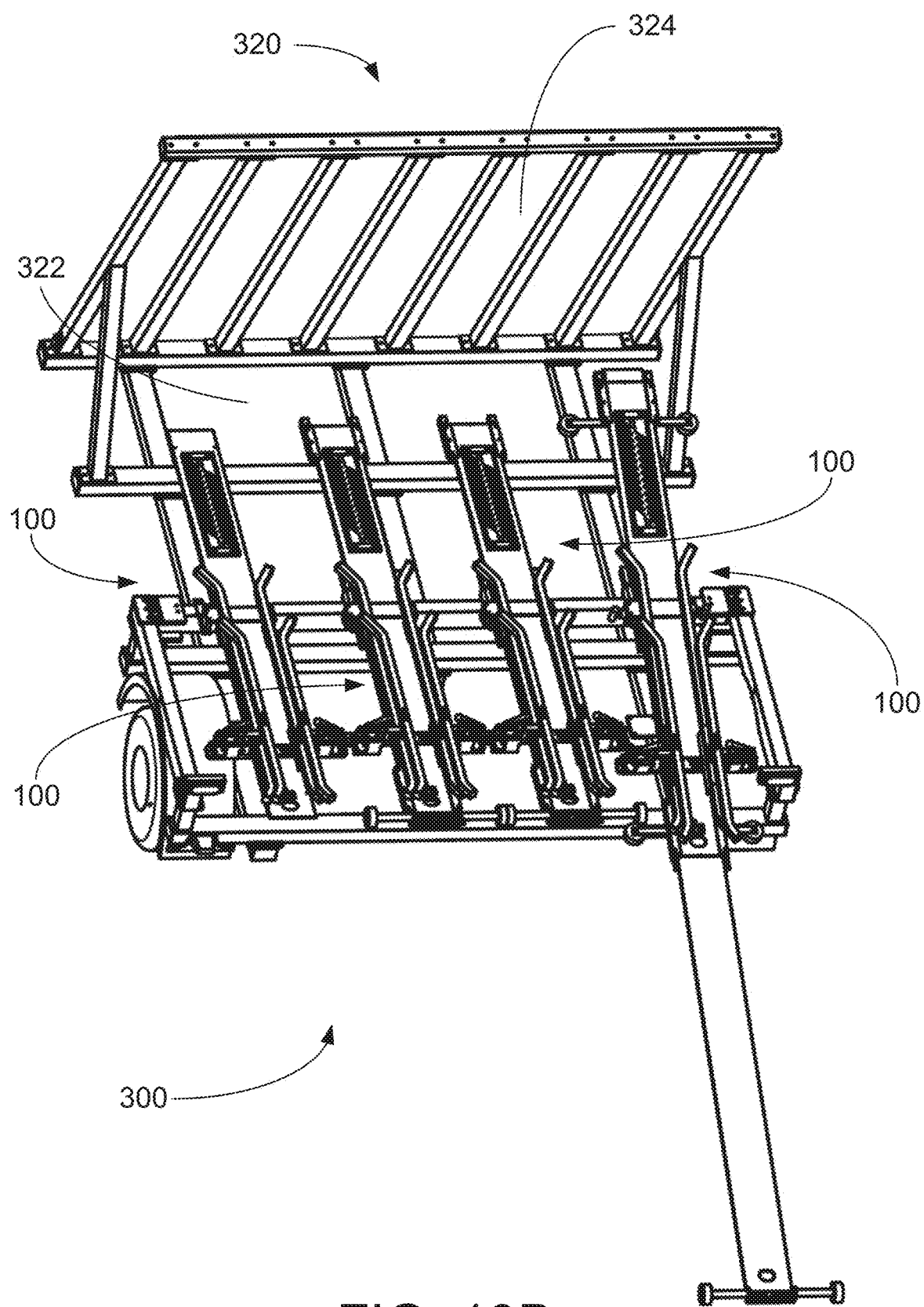
FIG. 13B is a top perspective view of the transport trailer of FIG. 13A having different carriers.
Figure 14:
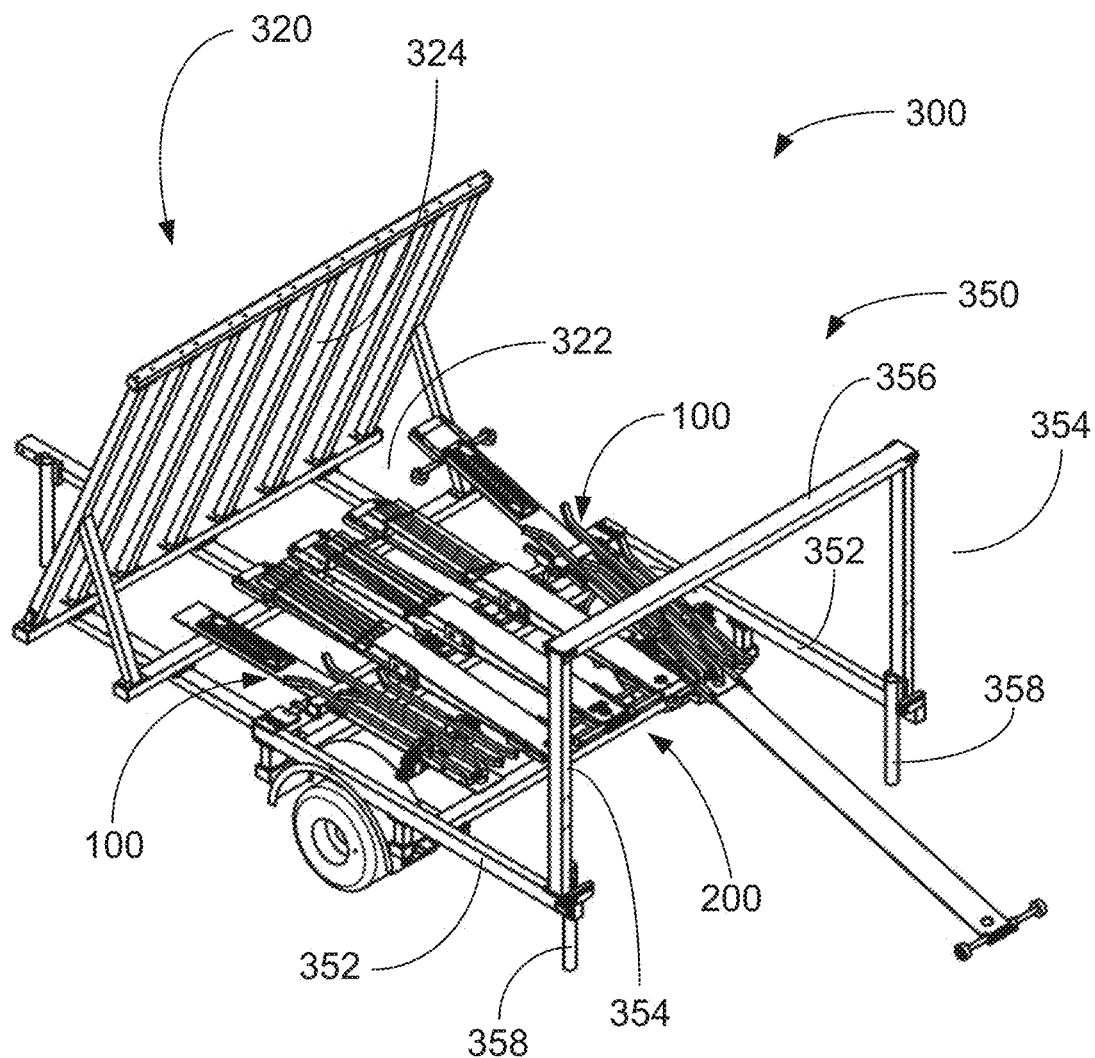
FIG. 14 is a perspective view of another transport trailer in accordance with embodiments of the present disclosure.

As such, the trailer 300 may be adapted to receive and transport one or more recreational vehicles (e.g., bicycles, tricycles, quadracycles, trailers, etc.) using one or more carriers 100, 200. For example, any combination of carriers 100 and carriers 200 may be supported by the trailer 300 to transport the various types of recreational vehicles. Specifically, as shown in FIGS. 13A and 13B, the trailer 300 includes four carriers 100 to support and transport a vehicle having a single lane track (e.g., a bicycle). It is noted that the plurality of channels angled at 45 degrees proximate the first end region of the carriers may help to position the carriers closer to one another on the trailer (e.g., narrowing the overall width and reducing the length) due to, e.g., a nesting effect (e.g., of the handlebars). Although, in one or more embodiments, adjacent carriers may be offset along the longitudinal axis such that the bicycles carried thereon may be nested (e.g., by offsetting the handlebars of adjacent bicycles). In FIGS. 13A and 13B, one of the four carriers 100 is configured in the extended position (e.g., the ramp extended and pivoted such that an end of the ramp contacts the ground surface) and the other three carriers 100 are configured in the storage position. As shown in FIG. 14, the trailer includes two carriers 100 to support and transport a vehicle having a single lane track (e.g., a bicycle) and one carrier 200 to support and transport a vehicle having a multiple lane track (e.g., a tricycle, a quadracycle, a trailer).

Figure 21:
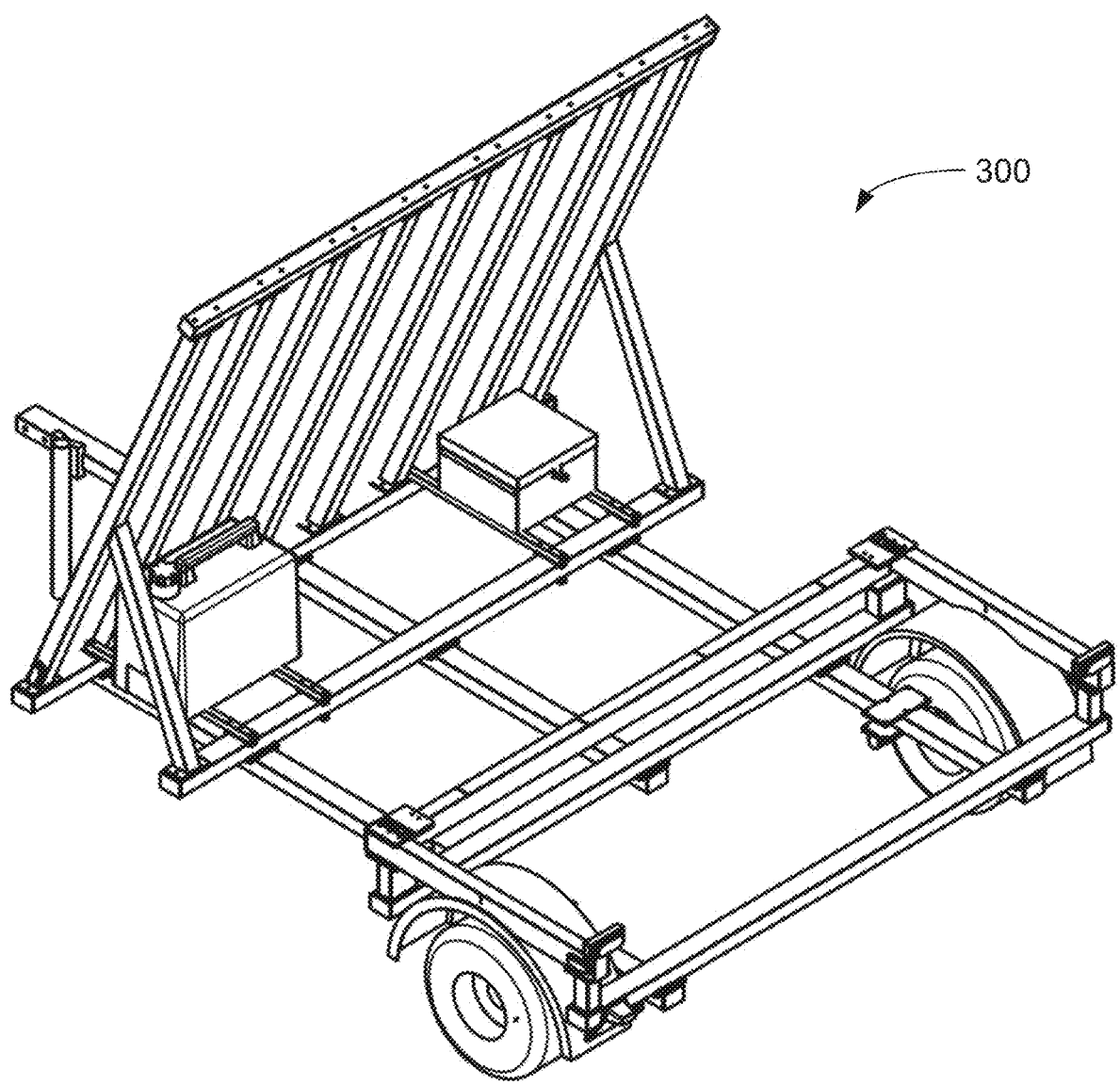
FIG. 21 is a perspective view of yet another embodiment of the transport trailer of FIG. 12.

Further, as shown in FIGS. 12-14, the trailer 300 may include a front fairing 320 and a floor area 322 located under the front fairing 320. The floor area 322 may include a solid floor or remain generally open (e.g., such that a solid floor surface may be optionally added later). A cover 324 may be positioned over the front fairing 320 to block wind, rain or anything kicked up by a vehicle when transporting the trailer 300. This may be particularly beneficial when carrying electronic bicycles due to the more expensive electronic components (e.g., by protecting them from potential harm when transporting). Further, the front slope and diagonal sides of the front fairing 320 may help to accelerate water, debris, etc. upward and outward such that the water, debris, etc. may be projected beyond the cargo and carriers 100, 200 of the trailer 300. In one or more embodiments, the cover 324 may include openings 325 near the floor area 322 and on the sides to provide access for loading and unloading cargo onto the floor area 322. In one or more embodiments, the cover 324 may be transparent or translucent such that a user may be able to see through the cover 324 (e.g., for better rearward visibility while driving and towing the trailer 300). The floor area 322 may be sized to fit a variety of different types of cargo including, e.g., batteries, chargers, generators, solar panels, tents or cabanas (e.g., to be used to further cover the trailer), backpacks, etc. In some embodiments, the floor area 322 may not be included or could be optionally installed at the need of the user. Further, optional specific purpose mounts may be provided for a more cost-effective method for securing and carrying specific devices such as, e.g., a generator and an enclosure for battery chargers for charging a battery enroute to destinations. For example, FIG. 21 illustrates a trailer 300 including various accessories that may be used with the trailer 300. For example, a generator and a charger/battery box may be included in the front accessory mounting area.

The trailer 300 may define a height (measured from the ground surface) of less than or equal to seven feet (e.g., the typical garage door opening height). Also, the trailer 300 may not include a platform or surface (e.g., in addition to the frame) such that the carriers 100, 200 may pivot in place to contact the ground surface (e.g., instead of a platform or surface) for loading and unloading. Therefore, a user accessing the trailer 300 may stand on the ground surface due to the lower height of the carriers 100, 200. Further, the trailer 300 may have a reduced weight due to the lack of a platform or surface (e.g., to offset the potential increased weight of the electronic bicycles).

Additionally, as shown in FIG. 14, the trailer 300 may include a lift frame 350 located near the back of the trailer 300. For example, the trailer 300 may include two rear extending members 352 (e.g., one on each side) projected from the back of the trailer 300 to provide clearance for the lift frame 350 (e.g., to provide room under the lift frame 350 that is away from the carriers 100, 200). The lift frame 350 may be movably coupled to the rear extending members 352 at vertical members 354 and have a top beam 356 spanning between the vertical members 354. The top beam 356 may provide a sturdy structure from which devices and transport vehicles (e.g., cot, wheelchair, etc.) may be supported and lifted for increased accessibility for the user. For example, the lift frame 350 (e.g., the top beam 356, specifically) may help in assisting transfer of a disabled person from a wheelchair to recreational vehicles like an electronic tricycle, an electronic quadracycle, a beach wheelchair, etc. (e.g., providing a lift point or trolley for use with a portable patient lifter). Further, the trailer 300 may include trailer tongue jacks 358 for raising the lift frame 350 from a travel position and a use position. Also, the trailer tongue jacks 358 may help support the lifted weight and level the lift frame 350.

FIGS. 15A and 15B illustrate another embodiment of the carrier 100 described herein. For example, the side rails 160 (e.g., on either side of the support 110) may extend for a substantial portion of the support 110 (e.g., extending between the first and second end regions 112, 114). Specifically, the side rails 160 may be spaced apart from the support 110 by about 2 inches to about 6 inches (e.g., about 4.25 inches). In one or more embodiments (e.g., as shown in FIG. 15A), one of the side rails 160 may be fixed relative to the support 110 while the other side rail 160 may move relative thereto. For example, one of the side rails 160 may be movable inward and outward using the clamp 140. In other words, the gap between the side rails 160 may be altered by only moving one of the side rails 160 through the clamp 140.

Further, as shown in FIG. 15A, the carrier 100 may include vertical supports 166 proximate the first end region 112 of the support 110 on either side of the support 110. The vertical supports 166 may assist with stabilizing and supporting the bicycle in an upright position (e.g., by maintaining the front wheel in a straight configuration). Additionally, the carrier 100 may also include a roller 190 proximate the first end region 112 and offset below the support 110 (e.g., as shown in FIG. 15B). For example, the roller 190 may assist with rolling the carrier 100 into a storage location (e.g., a garage, etc.) without dragging or carrying the carrier 100. Further, the carrier 100 may rest on the roller 190 and the ground engaging member 126 (e.g., on a ground surface) to position the carrier 100 in a horizontal orientation to, e.g., operate as a bike rack.

Figure 16A:
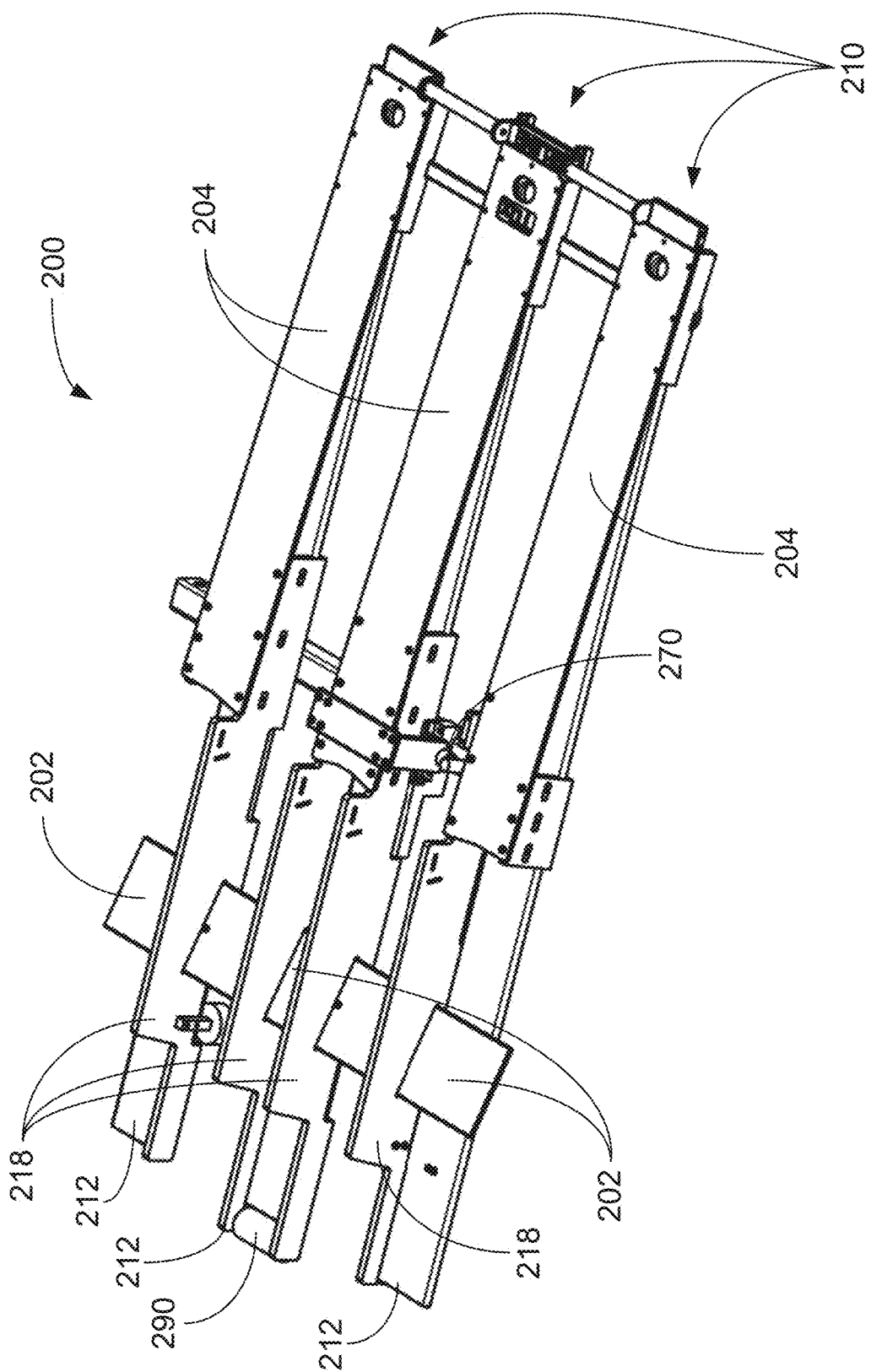
FIG. 16A is perspective view of another embodiment of the carrier of FIG. 8.
Figure 16B:
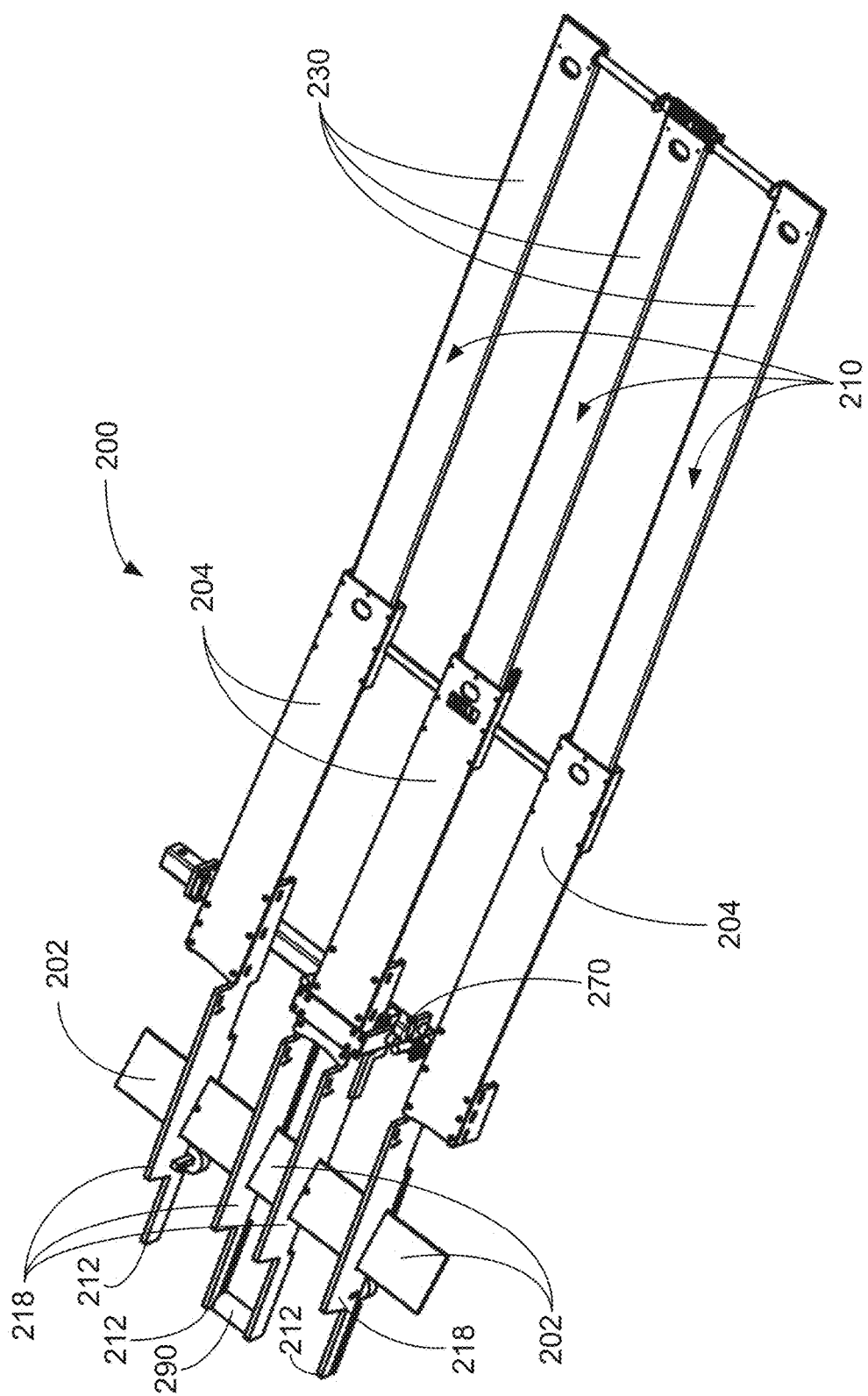
FIG. 16B is a perspective view of the carrier of FIG. 16A in an expanded position.

FIGS. 16A and 16B illustrate another embodiment of the carrier 200 described herein, e.g., to support a multiple track recreational vehicle (e.g., a tricycle, a quadracycle, a trailer, etc.) with at least two supports 210 positioned apart from one another and extending parallel to one another. As shown in FIGS. 16A and 16B, the rear portion 204 of the support 210 is similar to as described herein and the front portion 202 may include a crossbar extending across the at least two supports 210. Further the crossbar of the front portion 202 may be angled relative to horizontal to help support the front wheel of the bicycle (e.g., between the front and rear portions 202, 204). Additionally, the carrier 200 may include sidewalls 218 extending for a length of the carrier proximate the front portion 202. The sidewalls 218 may be positioned on one or both sides of each support 210 to, e.g., assist in maintaining a lateral position of the front wheel(s) of the bicycle. As shown in FIGS. 16A and 16B, the middle support 210 includes sidewalls on both sides proximate the front portion 202 and the outer supports 210 include sidewalls only on the inner side proximate the front portion 202.

Furthermore, the carrier 200 illustrated in FIGS. 16A and 16B only includes a roller 290 located at the front end region 212 of the middle support 210. Also, the pivot mount assembly 270 is only positioned on the middle support 210 and pivoting of the middle support 210 is transferred to the outer supports 210.

Figure 17:
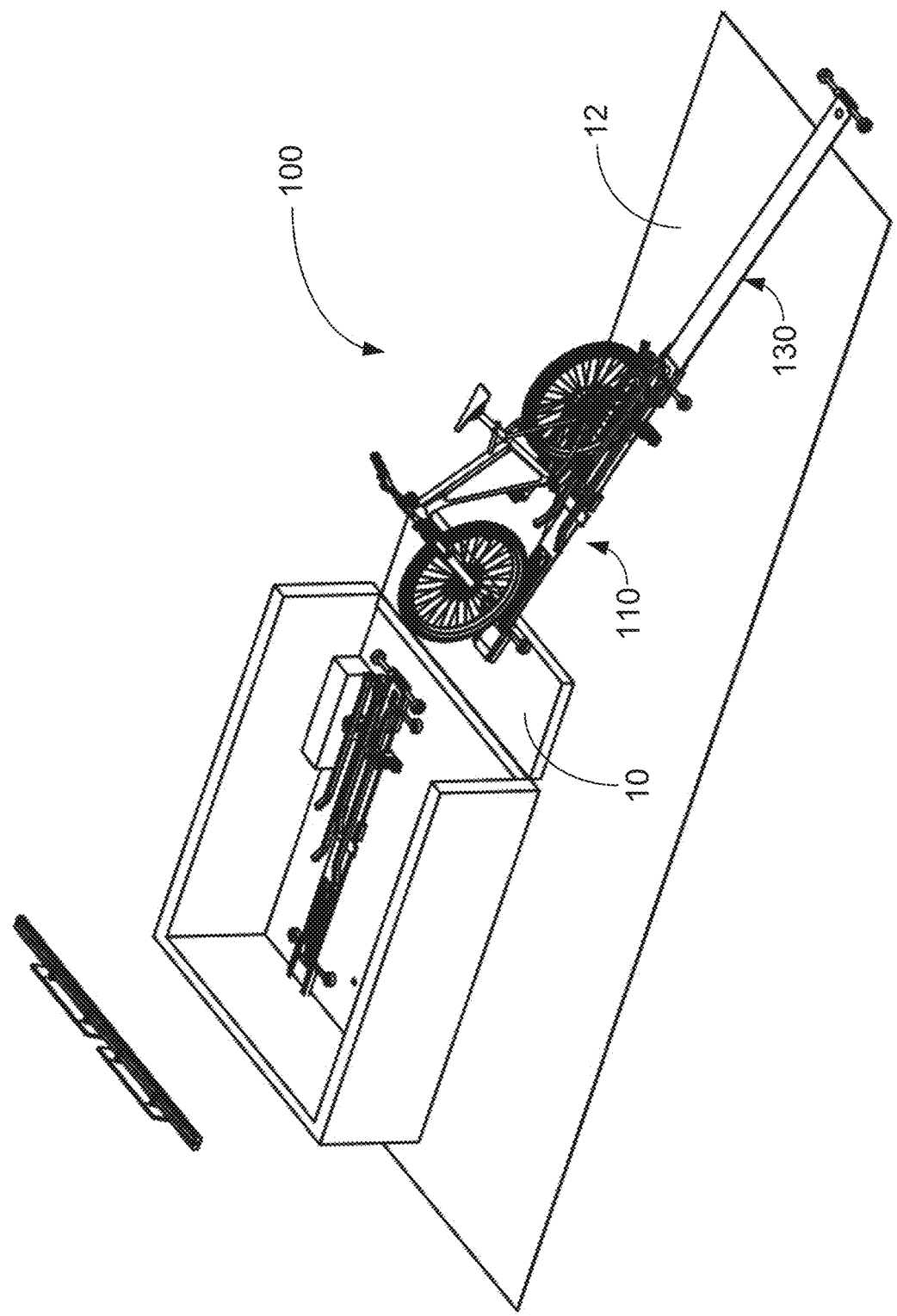
FIG. 17 is a perspective view of another embodiment of the two carriers of FIG. 7 including a bicycle positioned on the extended carrier.

FIG. 17 illustrates the carrier 100 extended and positioned between an elevated surface 10 (e.g., a truck bed) and a ground surface 12 with a bicycle in the loading process. For example, the rear wheel of the bicycle is clamped in to stabilize the bicycle relative to the carrier 100. Further, the front wheel of the bicycle is not yet rotated to 45 degrees and the bicycle is not yet strapped down. The next steps of loading the bicycle may include lifting the carrier 100 to a generally horizontal position, rolling the carrier 100 into the truck bed, and storing the ramp 130 to coincide with the support 110.

Figure 18:
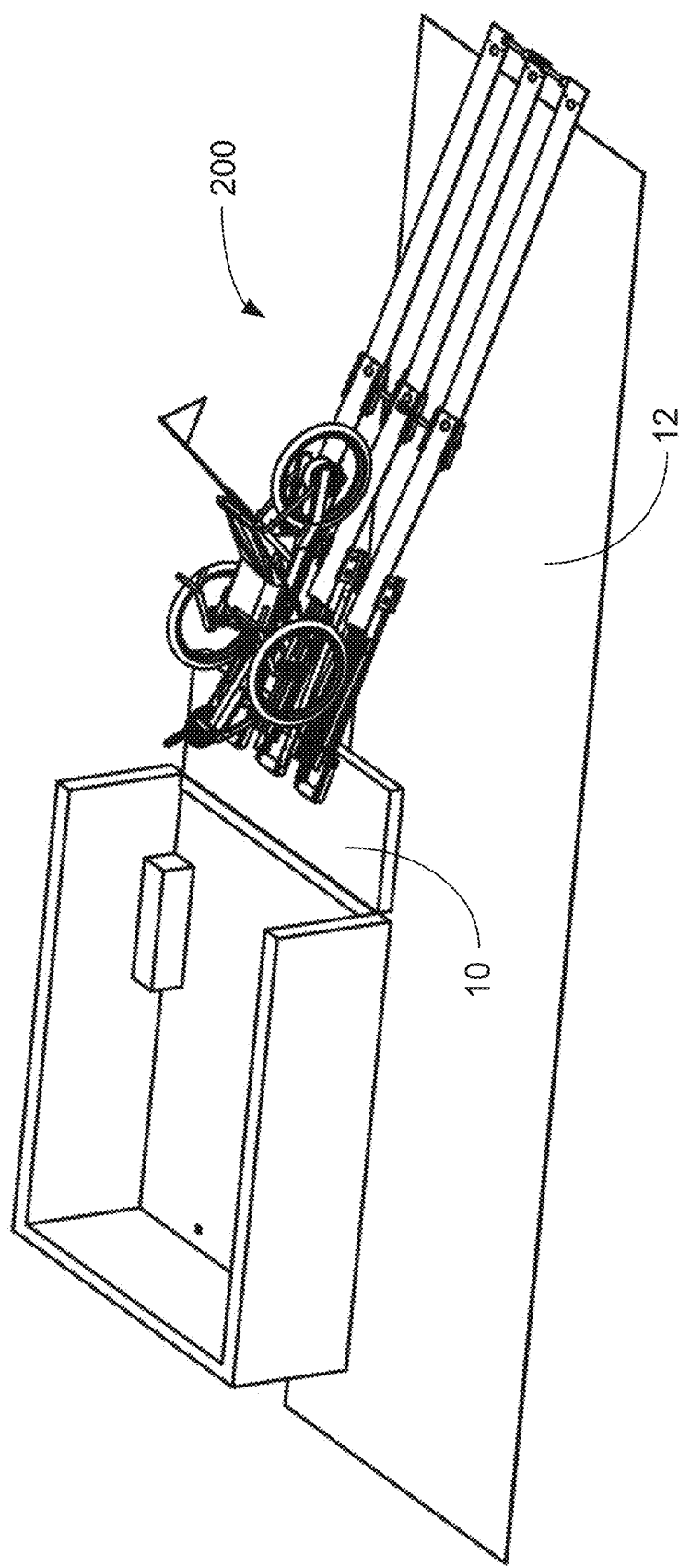
FIG. 18 is a perspective view of another embodiment of the carrier of FIG. 10 including a tricycle positioned thereon.
Figure 19:
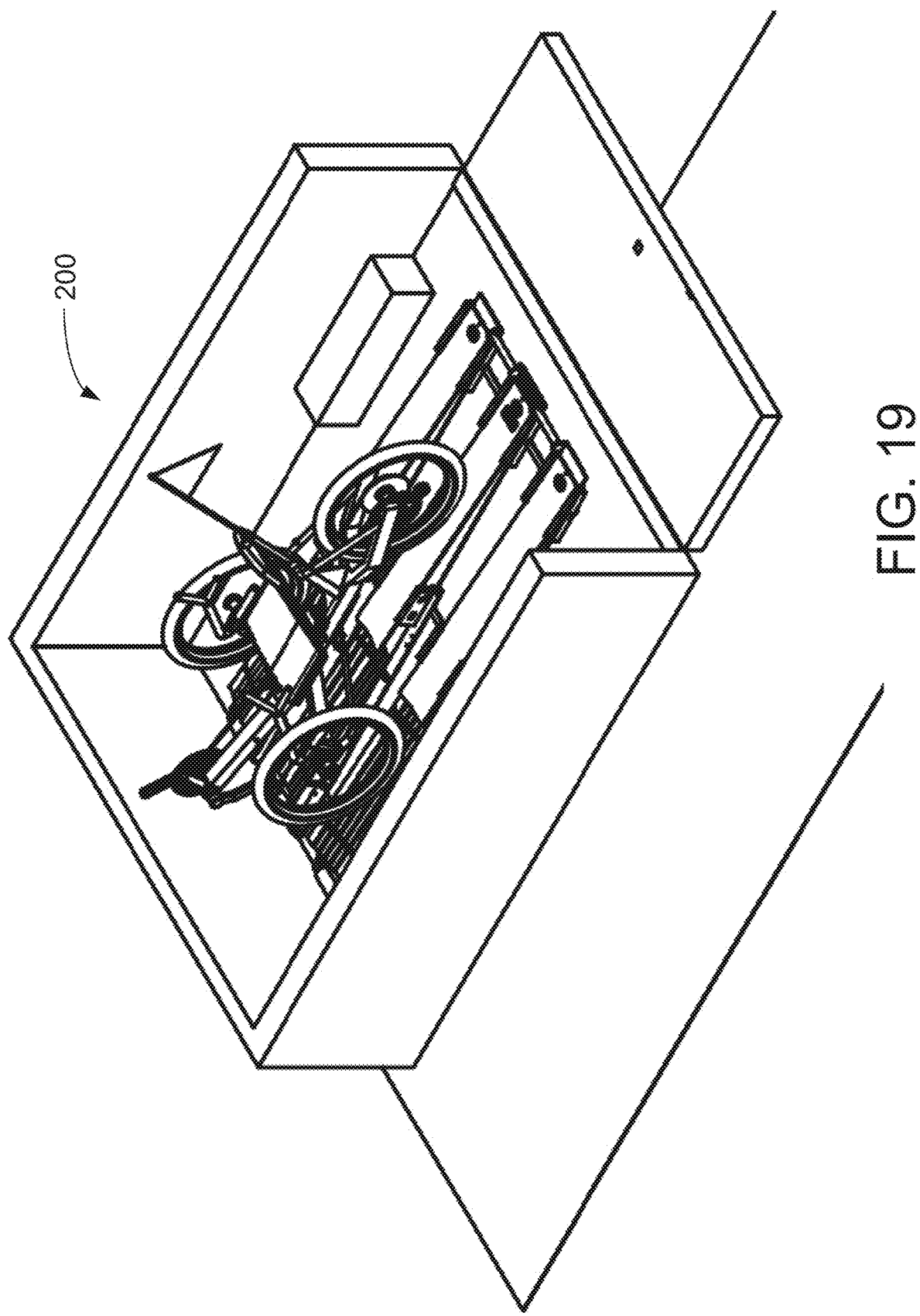
FIG. 19 is a perspective view of another embodiment of the carrier of FIG. 11 including a tricycle positioned thereon.

FIG. 18 illustrates the carrier 200 of FIG. 8 in the extended position between an elevated surface 10 and a ground surface 12 including a tricycle positioned on the carrier 200. FIG. 19 illustrates the carrier 200 loaded into the truck bed, in a stowed position, having the tricycle positioned on the carrier 200.

Figure 20:
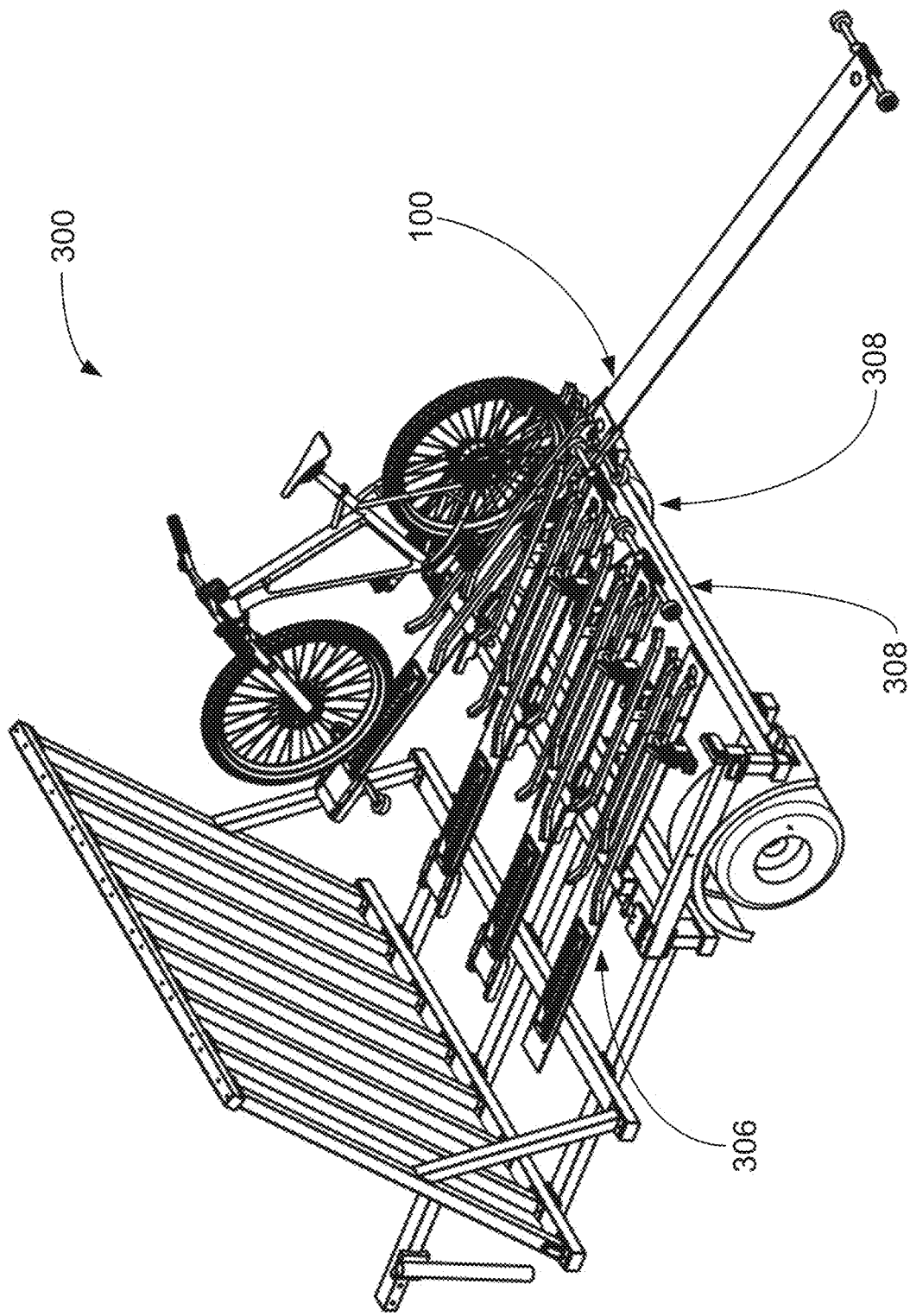
FIG. 20 is a perspective view of another embodiment of the transport trailer of FIG. 13A including a bicycle on a carrier supported by the transport trailer.

FIG. 20 illustrates the trailer 300 including a bicycle coupled to the carrier 100 before turning the front wheel 45 degrees, strapping down the bicycle, pivoting the carrier 100 to a generally horizontal position, and retracting the ramp 130. Additionally, carrier 306 positioned on the left side of the trailer 300 represents a simplified carrier that does not include a ramp, rollers, pivot mount, or bumper feet. The carrier 306 may be a more conventional bike carrier in which the bicycle may be lifted into position on the carrier 306 and secured to the carrier 308 using the features described herein. Also, carrier 308 is positioned in the middle two positions of the trailer 300 and includes an extension ramp and pivot mount, but does not include rolling features and the pivot mount includes a fixed pin (e.g., instead of a spring pin). In other words, the carrier 308 may be simplified and more permanently mounted to the trailer 300.

Figure 22:
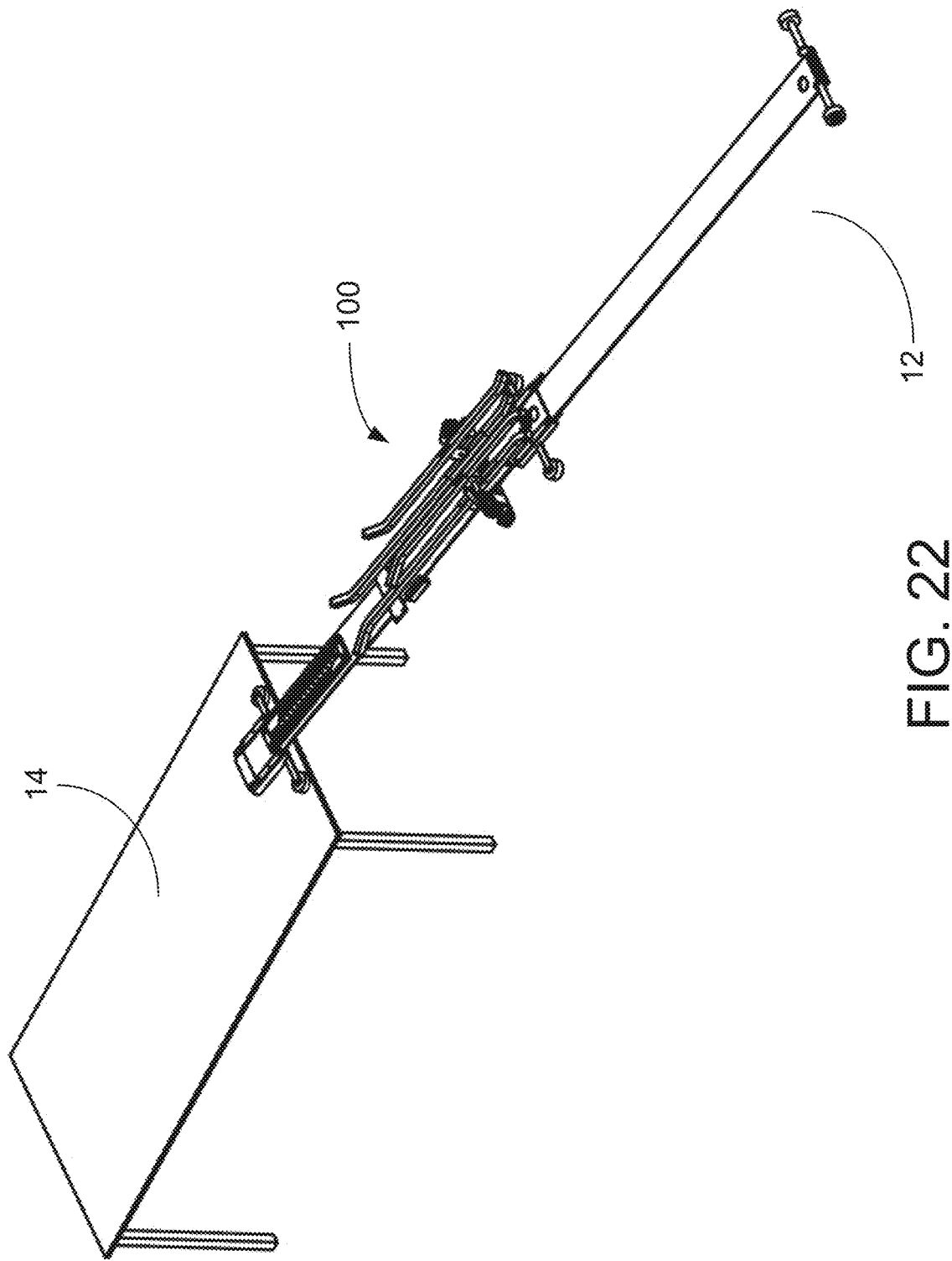
FIG. 22 is a perspective view of a carrier in an extended position and positioned relative to a table in accordance with embodiments of the present disclosure.
Figure 23:
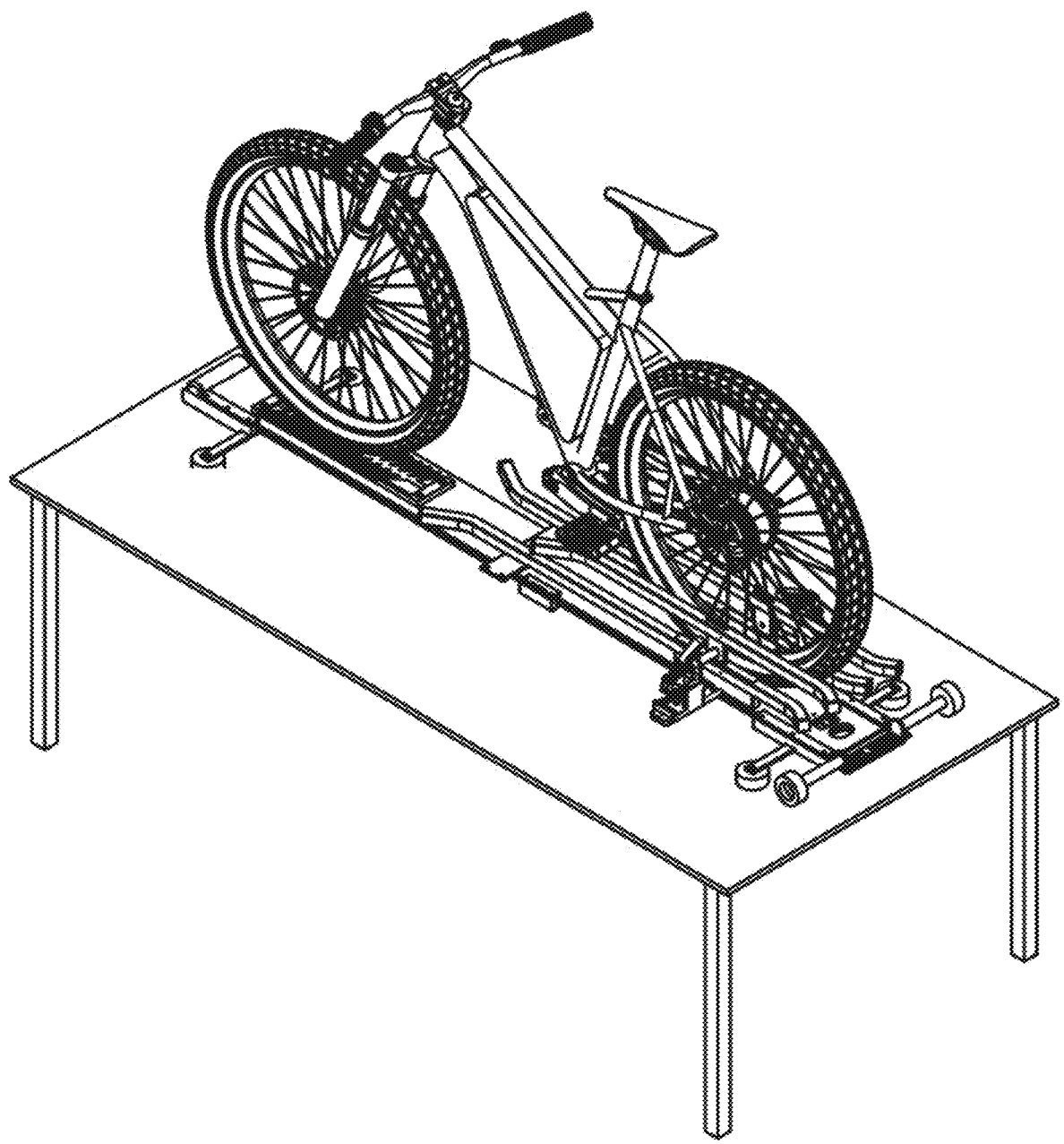
FIG. 23 is a perspective view of the carrier of FIG. 22 in a stowed position on the table and including a bicycle positioned thereon.

FIG. 22 illustrates a carrier 100 in an extended position between a service table 14 and the ground surface 12. The carrier 100 may be used to secure a bicycle (e.g., hold upright in a secure position) and move the bicycle from the ground surface 12 to the service table 14 so that the bicycle can be serviced at a more practical height (e.g., as shown in FIG. 23).

What is claimed is:

1. A carrier for supporting and transporting a bicycle, the carrier comprising:
   a support extending between a first end region and a second end region along a longitudinal axis, the support defining a top surface configured to receive and contact tires of the bicycle;
   a pivot mount assembly pivotably coupled to the support and comprising a retention housing, wherein the retention housing defines one or more slots extending along the longitudinal axis, wherein the support pivots about a pivot axis extending transverse to the longitudinal axis; and
   a ramp configured to move relative to the support along the longitudinal axis, wherein the ramp is configured to slide within the one or more slots of the retention housing, wherein the support is restricted from pivoting about the pivot axis when the ramp is within the one or more slots and the support is pivotable about the pivot axis when the ramp is not within the one or more slots.

2. The carrier of claim 1, wherein the pivot mount assembly further comprises a mounting member configured to be inserted into a hitch receiver.

3. The carrier of claim 1, wherein the retention housing extends on either side of the ramp and the one or more slots comprises a slot on either side of the ramp.

4. The carrier of claim 1, wherein the pivot axis is positioned relative to the support along the longitudinal axis between the first and second end regions at a position forward of a center of gravity of the carrier with the ramp extended and the bicycle supported on the support.

5. The carrier of claim 1, wherein the ramp is configurable between an extended position and a storage position, wherein the ramp is extended from the support when in the extended position and the ramp is stowed to coincide with the support when in the storage position.

6. The carrier of claim 1, further comprising at least one clamp located on one side of the support and configured to contact the bicycle.

7. The carrier of claim 6, wherein the at least one clamp is configured to move inward and outward between an engaged position and a disengaged position with the bicycle.

8. The carrier of claim 1, further comprising side rails positioned away from the top surface of the support and extending along the longitudinal axis, wherein the side rails are configured to guide tires of the bicycle and located such that a rear tire of the bicycle is positioned between the side rails when the bicycle is loaded on the carrier.

9. A carrier for supporting and transporting a recreational vehicle, the carrier comprising:
   at least two supports positioned apart from one another and extending substantially parallel to one another, each support extending between a first end region and a second end region along a longitudinal axis, each support comprising a front portion and a rear portion extending at an angle to horizontal such that a front end of the rear portion is spaced a gap distance from the front portion, wherein each support is configured to receive and contact tires of the recreational vehicle, wherein each support comprises one or more slots extending along the longitudinal axis;
   at least two ramps corresponding to each of the at least two supports and configured to move relative to the corresponding support along the longitudinal axis, wherein each of the at least two ramps slides within the one or more slots of the corresponding support; and
   a pivot mount assembly pivotably coupled to one support of the at least two supports and comprising a retention housing and an axis, wherein the retention housing defines one or more slots extending along the longitudinal axis, wherein the support pivots about the axis transverse to the longitudinal axis, wherein the ramp corresponding to the one support is configured to slide within the one or more slots of the retention housing, wherein the one support is restricted from pivoting about the axis when the ramp is within the one or more slots and the one support is pivotable about the axis when the ramp is not within the one or more slots.

10. The carrier of claim 9, further comprising one or more rollers located proximate the first end region of each of the at least two supports, wherein the one or more rollers are configured to rotate about an axis perpendicular to the longitudinal axis.

11. The carrier of claim 10, further comprising bumper feet located proximate the first end region of the at least two supports, wherein the bumper feet are configured to contact a surface, wherein the one or more rollers is spaced apart from the surface when bumper feet are contacting the surface.

12. The carrier of claim 9, wherein the at least two ramps are configurable between an extended position and a storage position, wherein the at least two ramps are extended from the at least two supports when in the extended position and the at least two ramps are stowed to coincide with the at least two supports when in the storage position.

* * * * *